United States Patent
Pal et al.

(10) Patent No.: US 10,998,956 B1
(45) Date of Patent: May 4, 2021

(54) OPTIMIZED RECEIVE BEAM SELECTION

(71) Applicant: QUALCOMM Incorporated, San Diego, CA (US)

(72) Inventors: Arnab Pal, Hyderabad (IN); Vishnu Namboodiri Karakkad Kesavan Namboodiri, Hyderabad (IN); Mahendran Kamatchi, Hyderabad (IN); Nagaraju Gajula, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/917,417

(22) Filed: Jun. 30, 2020

(30) Foreign Application Priority Data

Apr. 16, 2020 (IN) .............................. 202041016494

(51) Int. Cl.
*H04B 7/08* (2006.01)
(52) U.S. Cl.
CPC ........... *H04B 7/088* (2013.01); *H04B 7/0877* (2013.01)
(58) Field of Classification Search
CPC ............................. H04B 7/088; H04B 7/0877
See application file for complete search history.

(56) References Cited

U.S. PATENT DOCUMENTS

2020/0036431 A1* 1/2020 Petersson ............... H04B 7/088
2020/0304182 A1* 9/2020 Ibrahim ............... H04B 7/0452

* cited by examiner

Primary Examiner — Sung S Ahn
(74) Attorney, Agent, or Firm — Loza & Loza LLP

(57) ABSTRACT

Aspects of the disclosure relate to minimizing the number of antenna array modules on a wireless communication device utilized in forming beam pair links (BPLs) based on beam measurements obtained on each of a plurality of receive beams for each of a plurality of transmit beams. For at least one BPL, the wireless communication device selects a different receive beam that results in at least one fewer active antenna array module. In some examples, the different receive beam selected for a BPL has a beam measurement value within a predefined variance from a beam measurement value of an original receive beam for the BPL. In addition, the wireless communication device can confirm that the beam measurement values of both the original and different receive beams satisfy a minimum beam measurement value before switching the BPL to the different receive beam. Other aspects, features, and embodiments are also claimed and described.

30 Claims, 14 Drawing Sheets

OPTIMIZED RECEIVE BEAM SELECTION

PRIORITY CLAIM

This application claims priority to and the benefit of Indian Application No. 202041016494 filed in the Indian Patent Office on Apr. 16, 2020, the entire content of which is incorporated herein by reference as if fully set forth below in its entirety and for all applicable purposes.

TECHNICAL FIELD

The technology discussed below relates generally to wireless communication networks, and more particularly, to beam selection in beam-based communication scenarios (e.g., millimeter wave beams) Some embodiments and techniques enable and provide communication devices, methods, and systems with techniques for optimizing selection of receive beams in beam pair links for power savings.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array module for directional signal transmission and/or reception. Each antenna in the antenna array module transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink Each BPL includes corresponding transmit and receive beams on the base station and UE. For example, on the downlink, a BPL includes a transmit beam on the base station and a receive beam on the UE. To increase the data rate on the downlink, multiple BPLs can be used to facilitate spatial multiplexing of multiple data streams from the base station to the UE. At the UE, the different BPLs can include receive beams from the same antenna array module or different antenna array modules.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to minimizing the number of antenna array modules on a wireless communication device utilized in forming BPLs with a base station. The number of active antenna array modules can be minimized based on beam measurements obtained on each of the receive beams for each of the transmit beams. For at least one BPL, the wireless communication device can select a different receive beam that results in at least one fewer active antenna array module. In some examples, the different receive beam selected for a BPL has a beam measurement value within a predefined variance from a beam measurement value of an original receive beam for the BPL. In addition, the wireless communication device can confirm that the beam measurement values of both the original and different receive beams satisfy a minimum beam measurement value before switching the BPL from the original receive beam to the different receive beam. In this manner, the wireless communication device can jointly optimize both the BPLs based on the beam measurements and the number of active antenna array modules.

In one example, a method for wireless communication at a wireless communication device in a wireless communication network is disclosed. The method can include obtaining a plurality of beam measurements on each of a plurality of receive beams of the wireless communication device for each of a plurality of transmit beams of a radio access network (RAN) node. The method can further include forming a plurality of beam pair links utilized for communication with the RAN node based on the plurality of beam measurements. Each of the plurality of beam pair links can include one of the plurality of transmit beams and one of the plurality of receive beams. At least two of the plurality of beam pair links can include different respective receive beams of the plurality of receive beams corresponding to different respective antenna array modules of a plurality of antenna array modules on the wireless communication device. The method can further include minimizing a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links. The different receive beam can be selected based on the plurality of beam measurements.

Another example provides a wireless communication device in a wireless communication network including a wireless transceiver, a memory, and a processor communicatively coupled to the wireless transceiver and the memory. The processor and the memory can be configured to obtain a plurality of beam measurements on each of a plurality of receive beams of the wireless communication device for each of a plurality of transmit beams of a radio access network (RAN) node. The processor and the memory can further be configured to form a plurality of beam pair links utilized for communication with the RAN node based on the plurality of beam measurements. Each of the plurality of beam pair links can include one of the plurality of transmit beams and one of the plurality of receive beams. At least two of the plurality of beam pair links can include different respective receive beams of the plurality of receive beams corresponding to different respective antenna array modules of a plurality of antenna array modules on the wireless communication device. The processor and the memory can further be configured to minimize a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links. The different receive beam can be selected based on the plurality of beam measurements.

Another example provides a wireless communication device in a wireless communication network. The wireless communication device can include means for obtaining a plurality of beam measurements on each of a plurality of receive beams of the wireless communication device for each of a plurality of transmit beams of a radio access network (RAN) node. The wireless communication device can further include means for forming a plurality of beam pair links utilized for communication with the RAN node based on the plurality of beam measurements. Each of the plurality of beam pair links can include one of the plurality of transmit beams and one of the plurality of receive beams. At least two of the plurality of beam pair links can include different respective receive beams of the plurality of receive beams corresponding to different respective antenna array modules of a plurality of antenna array modules on the wireless communication device. The wireless communication device can further include means for minimizing a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links. The different receive beam can be selected based on the plurality of beam measurements.

Various method, system, device, and apparatus embodiments may also include additional features. For example, the different receive beam selected for one beam pair link can include the receive beam in another beam pair link.

In some examples, a first beam pair link of the plurality of beam pair links can include a first transmit beam of the plurality of transmit beams and a first receive beam of the plurality of receive beams and a second beam pair link of the plurality of beam pair links can include a second transmit beam of the plurality of transmit beams and a second receive beam of the plurality of receive beams. The first receive beam can correspond to a first antenna array module of the plurality of antenna array modules and the second receive beam can correspond to a second antenna array module of the plurality of antenna array modules different than the first antenna array module.

In this example, the wireless communication device can modify the first beam pair link for the first transmit beam to include the second receive beam when a difference between a first beam measurement of the plurality of beam measurements on the first receive beam for the first transmit beam and a second beam measurement of the plurality of beam measurements on the second receive beam for the second transmit beam is less than or equal to a first threshold. The wireless communication device can further confirm that the first beam measurement and the second beam measurement are each greater than or equal to a second threshold prior to modifying the first beam pair link for the first transmit beam to include the second receive beam. The wireless communication device can further turn on power to the second antenna array module and turn off power to the first antenna array module on the wireless communication device after modifying the first beam pair link for the first transmit beam to include the second receive beam corresponding to the second antenna array module.

In some examples, the wireless communication device can select the first threshold and the second threshold based on one or more factors. For example, the one or more factors can include at least one of a power state of the wireless communication device, a data rate, a mobility of the wireless communication device, or a time variance of a channel between the wireless communication device and the RAN node.

In some examples, the wireless communication device can measure a respective beam reference signal transmitted on each of the plurality of transmit beams on each of the plurality of receive beams to obtain the plurality of beam measurements. The wireless communication device can further select a first periodicity of minimizing the number of the plurality of antenna array modules utilized to form the plurality of beam pair links based on at least a second periodicity of measuring the respective beam reference signal transmitted on each of the plurality of transmit beams on each of the plurality of receive beams. In some examples, the first periodicity is equal to the second periodicity. In other examples, the first periodicity includes a multiple of the second periodicity. In an example, the first periodicity can be selected based on at least one of a power state of the wireless communication device, signal strength of downlink signals received from the wireless communication device, or a time variance of a channel between the wireless communication device and the RAN node.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
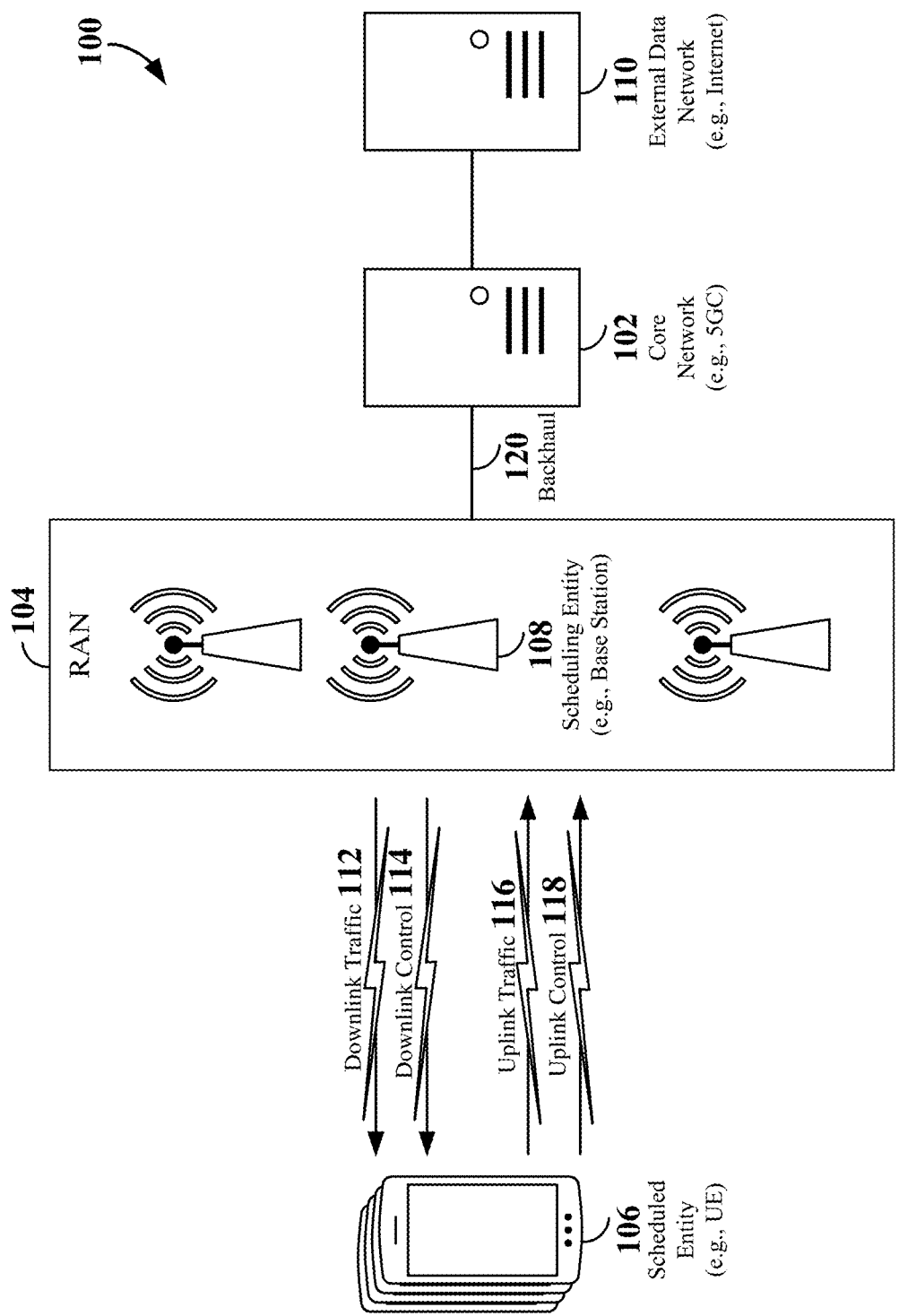
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
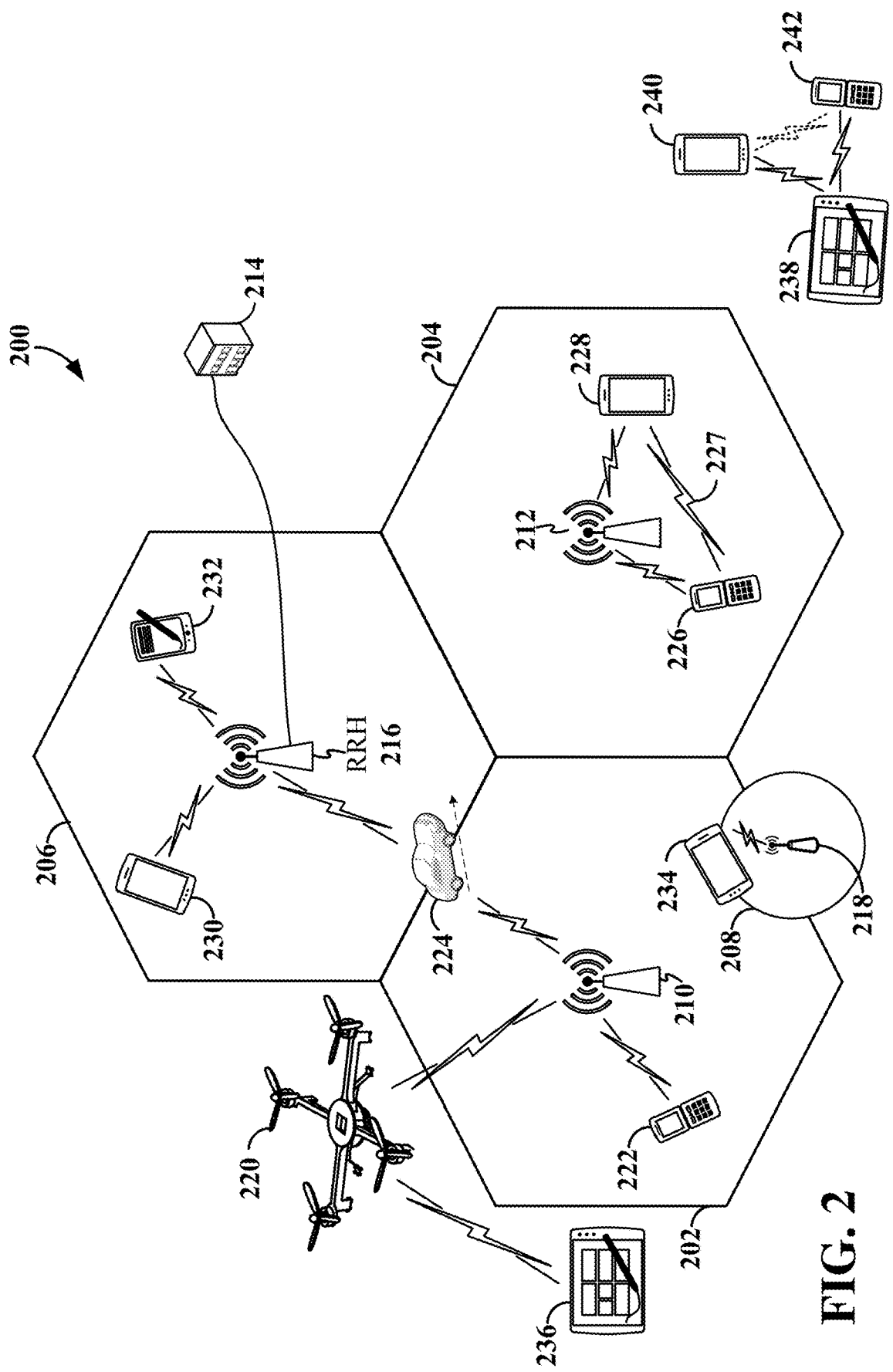
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
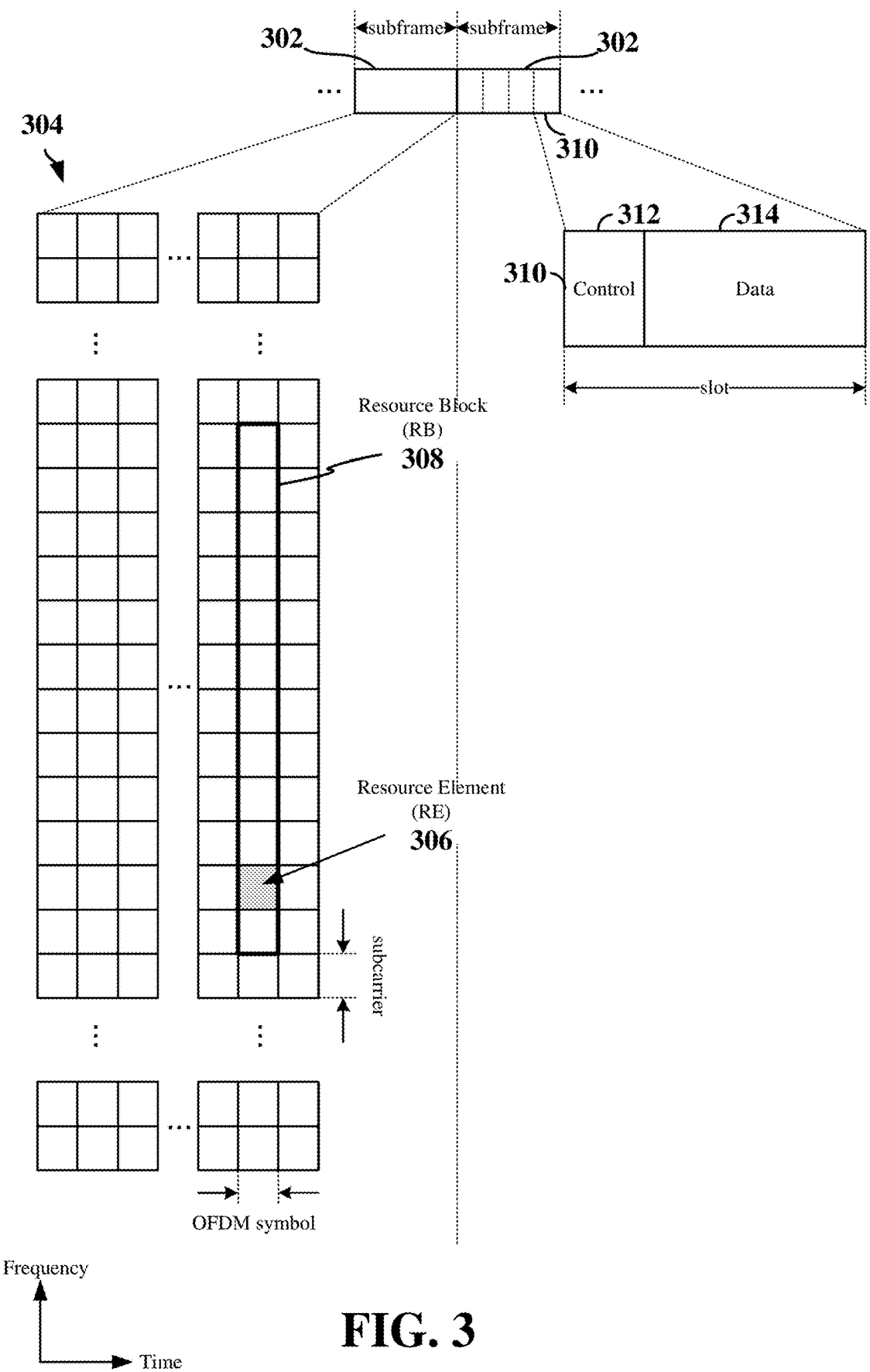
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port.

That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
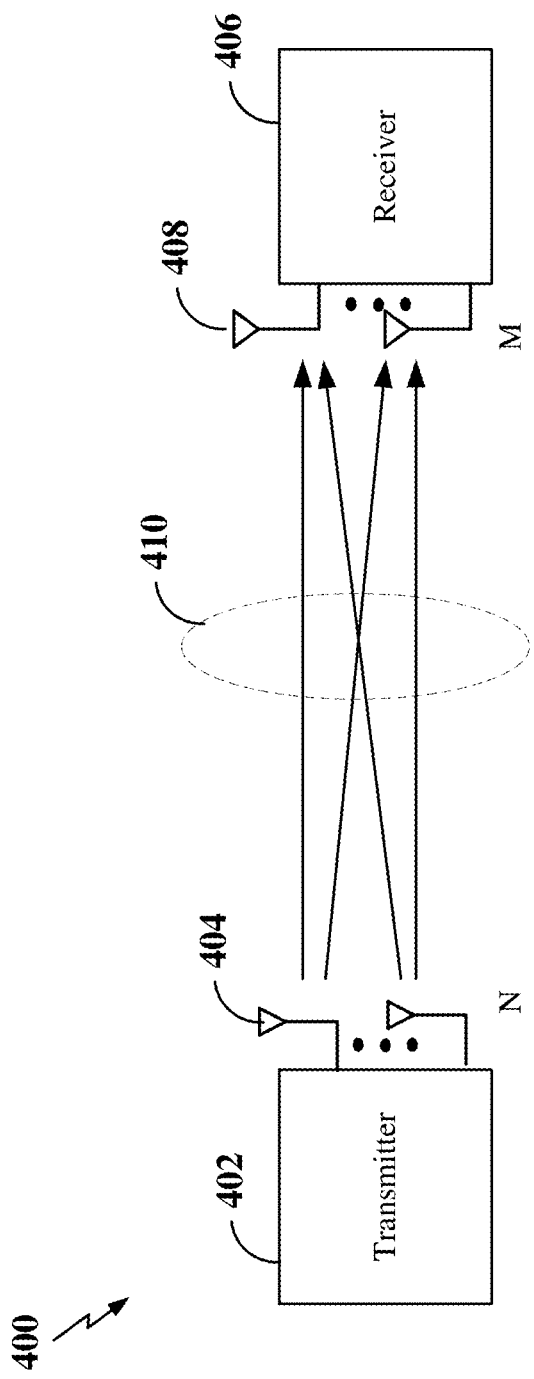
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. In some examples, to select one or more serving transmit beams for communication with a UE, the base station may transmit a reference signal, such as an SSB or CSI-RS, on each of a plurality of transmit beams in a beam-sweeping manner. The UE may measure the reference signal received power (RSRP) on each of the transmit beams using one or more receive beams on the UE and transmit a beam measurement report to the base station indicating the RSRP of each of the measured transmit beams. The base station may then select one or more serving transmit beams for communication with the UE based on the beam measurement report. In other examples, when the channel is reciprocal, the base station may derive the particular transmit beam(s) to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
FIG. 5 is a diagram illustrating an example of communication between a radio access network (RAN) node and a wireless communication device using beamforming according to some aspects.

FIG. 5 is a diagram illustrating communication between a radio access network (RAN) node 504 and a wireless communication device 502 using beamformed signals according to some aspects. The RAN node 504 may be any of the base stations or scheduling entities illustrated in FIGS. 1 and/or 2, and the wireless communication device 502 may be any of the UEs or scheduled entities illustrated in FIGS. 1 and/or 2.

In the example shown in FIG. 5, the RAN node 504 is configured to generate a plurality of transmit beams (e.g., downlink transmit beams) 506a-506h, each associated with a different beam direction. In some examples, the RAN node 504 may be configured to sweep or transmit each of the beams 506a-506h during a synchronization slot. For example, the RAN node 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, transmit beams 506a-506h transmitted during a same symbol may not be adjacent to one another. In some examples, the RAN node 504 may transmit more or less beams distributed in all directions (e.g., 360 degrees).

In addition, the wireless communication device 502 is configured to receive the beam reference signals on a plurality of receive beams (e.g., downlink receive beams) 508a-508e. In some examples, the wireless communication device 502 searches for and identifies each of the transmit beams 506a-506h based on the beam reference signals. The wireless communication device 502 then performs beam measurements (e.g., RSRP, SINR, RSRQ, etc.) on the beam reference signals on each of the receive beams 508a-508e to determine the respective beam quality of each of the transmit beams 506a-506h as measured on each of the receive beams 508a-508e.

The wireless communication device 502 can store the beam measurements within an internal beam measurement database. The wireless communication device 502 may further generate and transmit a beam measurement report, including the respective beam index and beam measurement of each transmit beam 506a-506h on each receive beam 508a-508e to the RAN node 504. The RAN node 504 may then select one or more transmit beams on which to transmit unicast downlink control information and/or user data traffic to the wireless communication device 502. In some examples, the selected transmit beam(s) have the highest gain from the beam measurement report. The wireless communication device 502 can further identify the transmit beams selected by the RAN node from the beam measurement database. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The RAN node 504 or the wireless communication device 502 may further select a corresponding receive beam on the wireless communication device 502 for each selected serving transmit beam to form a respective beam pair link (BPL) for each selected serving transmit beam. For example, the wireless communication device 502 can access the beam measurement database containing the most recent beam measurements to select the corresponding receive beam for each serving transmit beam. In some examples, the selected receive beam to pair with a particular transmit beam may have the highest gain for that particular transmit beam.

In one example, a single transmit beam (e.g., beam 506d) on the RAN node 504 and a single receive beam (e.g., beam 508c) on the wireless communication device may form a single BPL used for communication between the RAN node 504 and the wireless communication device 502. In another example, multiple transmit beams (e.g., beams 506c, 506d, and 506e) on the RAN node 504 and a single receive beam (e.g., beam 508c) on the wireless communication device 502 may form respective BPLs used for communication between the RAN node 504 and the wireless communication device 502. In another example, multiple transmit beams (e.g., beams 506c, 506d, and 506e) on the RAN node 504 and multiple receive beams (e.g., beams 508c and 508d) on the wireless communication device 502 may form multiple BPLs used for communication between the RAN node 504 and the wireless communication device 502. In this example, a first BPL may include transmit beam 506c and receive beam 508c, a second BPL may include transmit beam 508d and receive beam 508c, and a third BPL may include transmit beam 508e and receive beam 508d.

Figure 6:
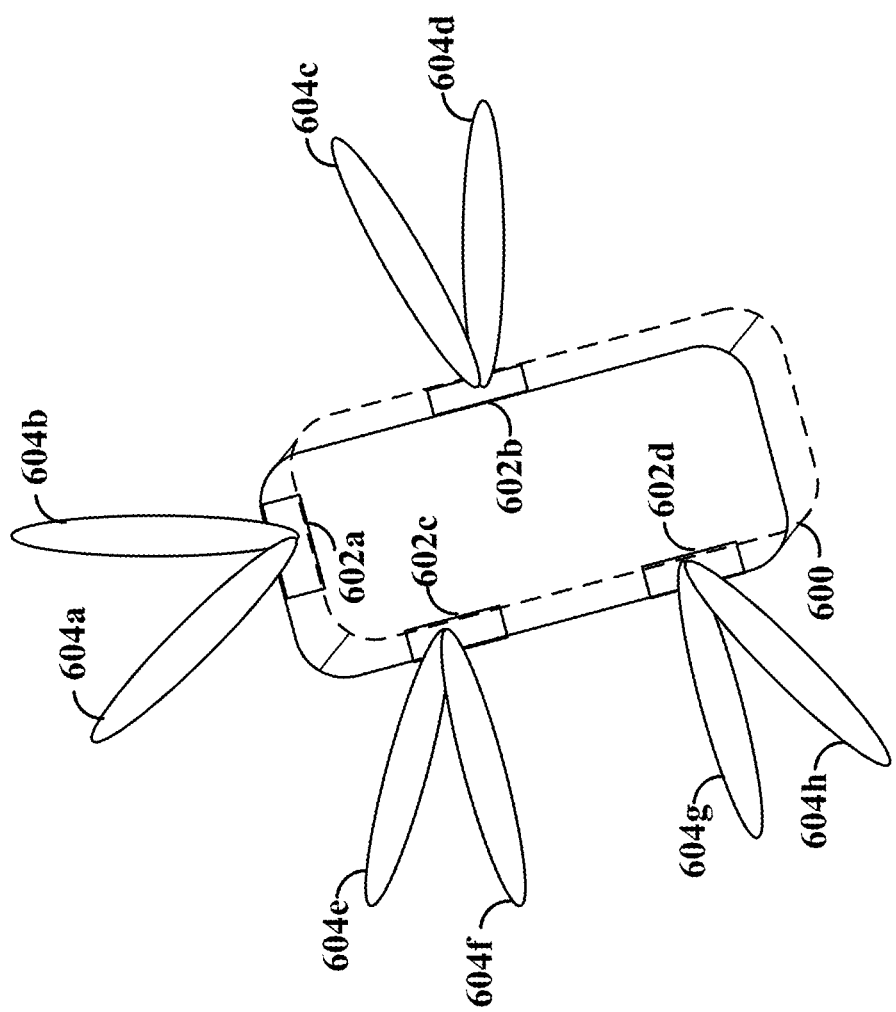
FIG. 6 is a diagram illustrating an example of a wireless communication device including a plurality of antenna array modules according to some aspects.

FIG. 6 is a diagram illustrating an example of a wireless communication device 600 including a plurality of antenna array modules 602a, 602b, 602c, and 602d according to some aspects. The wireless communication device 600 may correspond to any of the UEs or scheduled entities illustrated in FIGS. 1, 2 and/or 5. In addition, the wireless communication device 600 may be a 5G wireless communication device configured to transmit and receive mmWave frequencies using antenna array modules 602a-602d. Although four antenna array modules 602a-602d are illustrated in FIG. 6, it should be understood that the wireless communication device 600 may include any number of antenna array modules 602.

The antenna array modules 602a-602d may be located in the wireless communication device 600 at positions that enable each antenna array module 602a-602d to cover a respective portion of a sphere surrounding the wireless communication device 600. In particular, antenna array module 602a may be configured to generate a plurality of beams 604a and 604b, antenna array module 602b may be configured to generate a plurality of beams 604c and 604d, antenna array module 602c may be configured to generate a plurality of beams 604e and 604f, and antenna array module 602d may be configured to generate a plurality of beams 604g and 604h. Each of the plurality of beams 604a-604h may be directed towards a different portion of a coverage area (e.g., of the sphere) of the respective antenna array module 602a-602d.

The number of beams 604a-604h generated per antenna array module 602a-602d may depend, for example, on the number of antenna subarrays in each antenna array module 602a-602d. In general, to meet link budget requirements for downlink transmissions (e.g., from the gNB to the wireless communication device 600), each antenna array module 602a-602d may support N beams per N antenna subarrays in the module. For example, assuming there is one antenna subarray per antenna array module 602a-602d, the wireless communication device 600 may support N beams per antenna array module and 4N beams total. If N=2, as shown in the example of FIG. 6, the wireless communication device 600 may support 8 total beams (e.g., two beams from each antenna array module 602a-602d). However, it should be understood that each antenna array module 602a-602d may support any suitable numbers of beams.

In general, a RAN node (e.g., base station, such as a gNB) may communicate with the wireless communication device 600 using one or more pairs of beams on both the downlink and uplink. The beam pair links (BPLs) for the downlink and the uplink may include beams from the same antenna array module 602a-602d or different antenna array modules 602a-602d. In some examples, multiple BPLs are utilized for the downlink Each BPL can include a transmit beam on the RAN node and a receive beam on the wireless communication device 600. When at least two of the receive beams associated with at least two of the BPLs are associated with different antenna array modules, each of the antenna array modules generating one of the selected receive beams is turned on (e.g., powered up) during downlink reception. For example, if there are four BPLs and each BPL includes a respective receive beam (e.g., receive beams 604a, 604c, 604f, and 604h) from a different antenna array module 602a-602d, the wireless communication device 600 turns on power to each of the antenna array modules 602a-602d to receive one or more signals from the RAN node on the BPLs.

In mmWave wireless communication devices 600, the power consumed by the radio frequency (RF) circuitry, and in particular, the active antenna array modules 602a-602d of the RF circuitry, represents a significant portion (e.g., approximately 70%) of the overall power consumption of the wireless communication device 600. For low power and/or low capability wireless communication devices 600, turning on multiple antenna array modules 602a-602d simultaneously can severely impact the battery life of such devices. In addition, the large power consumption resulting from activating multiple antenna array modules 602a-602d can also negatively affect wireless communication devices supporting either eMBB or ultra-reliable low-latency communication (URLLC) use cases. Therefore, reducing the number of antenna array modules 602a-602d that are active at a time can result in considerable power savings on the wireless communication device.

In various aspects of the disclosure, a wireless communication device can minimize the number of antenna array modules 602a-602d utilized in forming BPLs with a RAN node based on the beam measurements obtained on each of the receive beams for each of the transmit beams. For at least one BPL, the wireless communication device can select a different receive beam that results in at least one fewer active antenna array module 602a-602d based on the beam measurements. In some examples, the different receive beam selected for a BPL includes one of the receive beams utilized in another BPL having a beam measurement value within a predefined variance from the beam measurement value of an original receive beam for the BPL. In this manner, the wireless communication device 600 can jointly optimize both the BPLs based on the beam measurements and the number of active antenna array modules 602a-602d.

For example, assume there are M transmit beams and L receive beams forming M BPLs, where L is equal to M. Further assume that the L receive beams correspond to L antenna array modules. In addition, for the L receive beams, there are L beam measurements (e.g., RSRP values). Each of the L beam measurements can indicate, for example, the RSRP measured on one of the receive beams for the corresponding transmit beam within the respective BPL. When the beam measurement of the (L−1) receive beam of the (M−1) BPL is within a threshold (e.g., alpha dBm) of the $L^{th}$ receive beam of the $M^{th}$ BPL, the (L−1) receive beam may be used in both the (M−1) BPL and the $M^{th}$ BPL. For example, if the beam measurement of the (L−1) receive beam measures X dBm and the beam measurement of the $L^{th}$ receive beam measures X+alpha dBm, the (L−1) receive beam can serve both the (M−1) transmit beam and the $M^{th}$ transmit beam.

In some examples, the wireless communication device can further confirm that the beam measurement of the (L−1) receive beam satisfies a minimum beam measurement value (e.g., beta dBm) before switching the $M^{th}$ BPL to include the (L−1) receive beam instead of the $L^{th}$ receive beam. For example, if the beam measurement of the (L−1) receive beam measures X dBm, the beam measurement of the $L^{th}$ receive beam measures X+alpha dBm, and the beam measurement of both the $L^{th}$ receive beam and the (L−1) receive beam is greater than or equal to beta dBm, the (L−1) receive beam can serve both the (M−1) transmit beam and the $M^{th}$ transmit beam. Once the BPL switch occurs, the wireless communication device can determine that the $L^{th}$ receive beam is no longer being used in a BPL. Therefore, the wireless communication device can turn off the power to the $L^{th}$ antenna array module.

In an example, a first BPL can include a first transmit beam on the RAN node and a first receive beam (e.g., beam 604a) associated with a first antenna array module 602a on the wireless communication device 600. In addition, a second BPL can include a second transmit beam on the RAN node and a second receive beam (e.g., beam 604c) associated with a second antenna array module 602b on the wireless communication device 600. When a difference between the respective beam measurements (e.g., RSRP values) on the first receive beam 604a and the second receive beam 604c is less than or equal to a first threshold (e.g., alpha dBm) and the beam measurements of the first receive beam 604a and the second receive beam 604c are greater than or equal to a second threshold (e.g., beta dBm), the wireless communication device 600 can modify the first BPL for the first transmit beam to include the second receive beam 604c. Thus, the wireless communication device 600 can switch from the first receive beam 604a to the second receive beam 604c to receive downlink transmissions from the RAN node on the first transmit beam. The wireless communication device 600 can then turn off power to the first antenna array module 602a. It should be understood that the joint optimization procedure described above can be extended to any number of antenna array modules and receive beams, such that a single receive beam can serve multiple (e.g., two or more) transmit beams.

Figure 7:
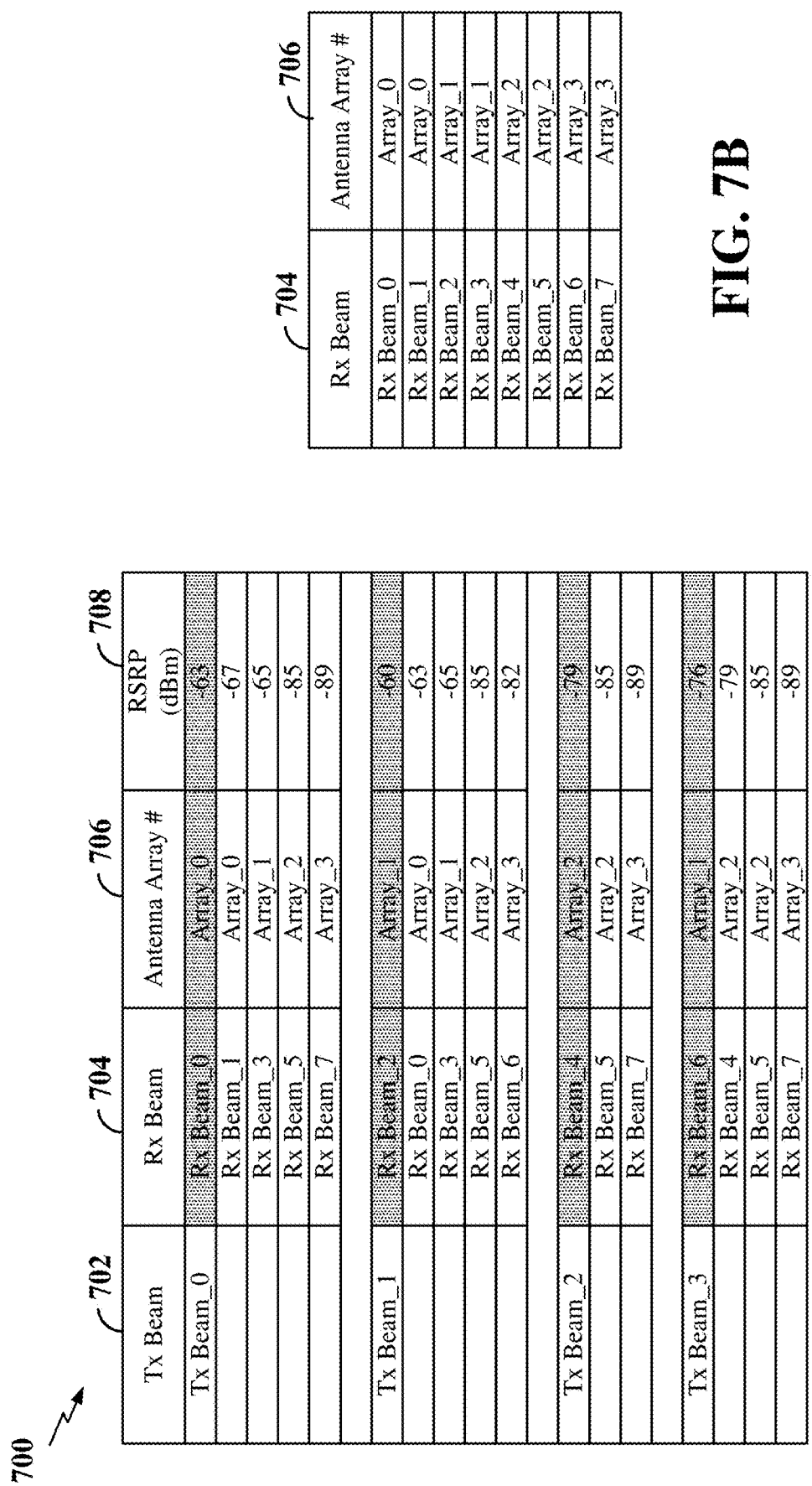
FIG. 7A illustrates an example of at least a portion of a beam measurement database according to some aspects.
FIG. 7B illustrates an example mapping between antenna array modules and receive beams in the beam measurement database of FIG. 7A according to some aspects.

FIG. 7A illustrates an example of at least a portion of a beam measurement database 700 maintaining beam measurements 708 obtained on a plurality of receive beams 704 of a wireless communication device (e.g., a UE) for a plurality of transmit beams 702 of a RAN node (e.g., a base station, such as a gNB). Each of the receive beams 704 corresponds to an antenna array module 706. In some examples, each antenna array module 706 can be configured to generate one or more of the receive beams 704.

The mapping between antenna array modules 706 and receive beams 704 in the beam measurement database 700 of FIG. 7A is illustrated in FIG. 7B. As shown in FIG. 7B, there are four antenna array modules 706 (Array_0, Array_1, Array_2, and Array_3). In addition, each of the antenna array modules 706 is configured to generate two of the receive beams 704 (Rx Beam). For example, Rx Beam_0 and Rx Beam_1 correspond to Array_0, Rx Beam_2 and Rx Beam_3 correspond to Array_1, Rx Beam_4 and Rx Beam_5 correspond to Array_2, and Rx Beam_6 and Rx Beam_7 correspond to Array_3.

Referring again to the example shown in FIG. 7A, the beam measurement database 700 stores beam measurements 708 for each of a plurality of serving transmit beams 702 (e.g., transmit beams selected by the RAN node for downlink communication with the wireless communication device). Here, the serving transmit beams (Tx Beam) include four transmit beams, Tx Beam_0, Tx Beam_1, Tx Beam_2, and Tx Beam_3. The beam measurements 708 include the RSRP (in decibel milliwatts (dBm)) measured on various receive beams 704 for each of the transmit beams 702. For example, for Tx Beam_0, the measured RSRP 708 is shown for Rx Beam_0, Rx Beam_1, Rx Beam_3, Rx Beam_5, and Rx Beam_7. Of the receive beams 704 measured for Tx Beam_0, Rx Beam_0 has the highest RSRP, and therefore, is the serving receive beam 704 for Tx Beam_0 (as indicated by the shading in FIG. 7A). Thus, a BPL is formed between Tx Beam_0 and Rx Beam_0. Similarly, for Tx Beam_1, the serving receive beam 704 is Rx Beam_2. In addition, for Tx Beam_2, the serving receive beam 704 is Rx Beam_4. Likewise, for Tx Beam_3, the serving receive beam 704 is Rx Beam_6.

Based on the beam measurement database 700 shown in FIG. 7A, each of the serving receive beams 704 (Rx Beam_0, Rx Beam_2, Rx Beam_4, and Rx Beam_6) corresponds to a different antenna array module 706 (Array_0, Array_1, Array_2, and Array_3, respectively. Thus, the wireless communication device turns on each of the antenna array modules 706 (Array_0, Array_1, Array_2, and Array_3) to receive downlink signals on the serving transmit beams (Tx Beam_0, Tx Beam_1, Tx Beam_2, and Tx Beam_3).

In various aspects of the disclosure, to reduce the number of antenna array modules 706 utilized to form the BPLs for each of the serving transmit beams (Tx Beam_0, Tx Beam_1, Tx Beam_2, and Tx Beam_3), the wireless communication device can perform a joint optimization on the beam measurements 708 and antenna array modules 706 in the beam measurement database 700. During joint optimization, the wireless communication device can compare the beam measurements 708 of each of the serving receive beams (e.g., Rx Beam_0, Rx Beam_2, Rx Beam_4, and Rx Beam_6) to minimize the number of active antenna array modules 706. In particular, the wireless communication device can determine whether a difference between beam measurements 708 of two serving receive beams 704 is less than a first threshold (e.g., alpha dBm).

When the difference in beam measurements 708 of two serving receive beams 704 is less than the first threshold, the wireless communication device can use one of the serving receive beams 704 to serve both of the transmit beams. Using the example shown in FIG. 7A, if the beam measurement 708 of Rx Beam_0 is within alpha dBm of the beam measurement of Rx Beam_2, the wireless communication device can select either Rx Beam_0 or Rx Beam_2 to form respective BPLs with each of Tx Beam_0 and Tx Beam_1. The beam measurement 708 of Rx Beam_0 is −63 dBm and the beam measurement 708 of Rx Beam_2 is −60 dBm. Therefore, when alpha is set to 3 dBm or more, the wireless communication device selects one of the Rx beam_0 or Rx Beam_2 to form respective BPLs with each of Tx Beam_0 and Tx Beam_1. Similarly, since the difference between the beam measurements 708 of Rx Beam_4 and Rx Beam_6 is less than or equal to 3 dBm, the wireless communication device can select one of Rx Beam_4 or Rx Beam_6 to form respective BPLs with each of Tx Beam_2 and Tx Beam_3.

In some examples, the wireless communication device can further compare the beam measurements 708 of the receive beams 704 to a second threshold (e.g., beta dBm) to verify that the RSRP of the receive beams 704 meets a minimum RSRP value. For example, the second threshold may be −80 dBm. The beam measurements 708 of each of the serving beams Rx Beam_0, Rx Beam_2, Rx Beam_4, and Rx Beam_6 are each within the second threshold of −80 dBm (e.g., greater than or equal to −80 dBm). Therefore, the wireless communication device can select either Rx Beam_0 or Rx Beam_2 to serve both Tx Beam_0 and Tx Beam_1, and can further select either Rx Beam_4 or Rx Beam_6 to serve both Tx Beam_2 and Tx Beam_3.

In an example, the wireless communication device can select Rx Beam_0 to serve both Tx Beam_0 and Tx Beam_1 and Rx Beam_4 to serve both Tx Beam_2 and Tx Beam_3. Therefore, the wireless communication device can modify the BPLs for Tx Beam_1 and Tx Beam_3 to include Rx Beam_0 and Rx Beam_4, respectively. In addition, the wireless communication device can turn on the power to antenna array modules 706 corresponding to Rx Beam_0 and Rx Beam_4 and turn off power to the antenna array modules 706 corresponding to Rx Beam_2 and Rx Beam_6. Here, the antenna array modules 706 include Array_1 and Array_3.

Figure 8:
FIG. 8 illustrates an example of an optimized beam measurement database according to some aspects.

An example of an optimized beam measurement database 800 reflecting the new BPLs is shown in FIG. 8. Compared with the beam measurement database 700 shown in FIG. 7, in the example shown in FIG. 8, the optimized beam measurement database 800 only maintains the beam measurements 808 obtained on receive beams 804 of active antenna array modules 806 for each of the serving transmit beams 802. Thus, the beam measurements 808 of inactive antenna array modules (e.g., antenna array modules for which the power is turned off) have been excluded from the optimized beam measurement database 800. The optimized beam measurement database 800 further indicates that Rx Beam_0 forms respective BPLs with Tx Beam_0 and Tx Beam_1, and that Rx Beam_4 forms respective BPLs with Tx Beam_2 and Tx Beam_3.

Figure 9:
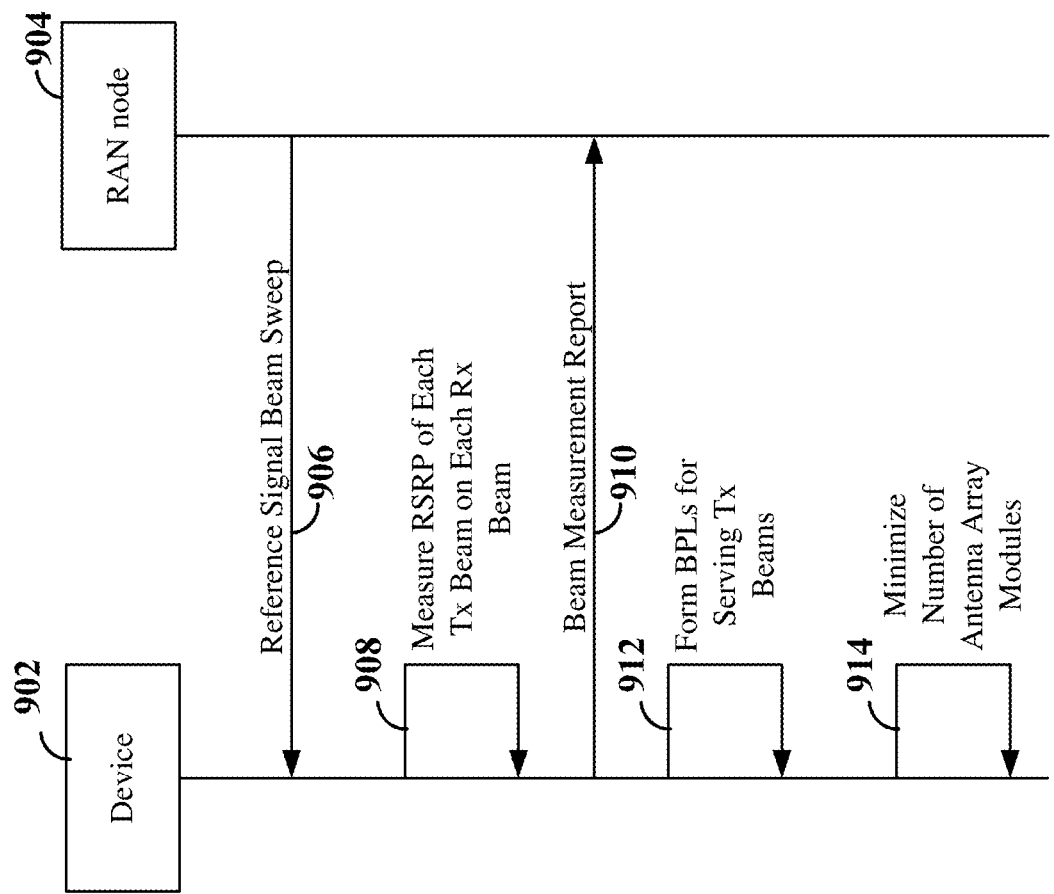
FIG. 9 illustrates an example of signaling between a wireless communication device and a RAN node for optimized receive beam selection according to some aspects.

FIG. 9 illustrates an example of signaling between a wireless communication device (Device) 902 and a RAN node 904 for optimized receive beam selection according to some aspects. The wireless communication device 902 may correspond to any of the UEs or scheduled entities shown in FIGS. 1, 2, 5 and/or 6. In addition, the RAN node 904 may correspond to any of the base stations or scheduling entities shown in FIGS. 1, 2, and/or 5.

At 906, the RAN node 904 performs a beam sweep to transmit a reference signal (e.g., an SSB or CSI-RS) on each of a plurality of transmit beams (e.g., downlink transmit beams) to the wireless communication device 902. At 908, the wireless communication device 902 identifies and measures the RSRP or other suitable beam measurement of a respective beam reference signal on each receive beam of the wireless communication device for each transmit beam received by the wireless communication device. The wireless communication device may then store the beam measurements within an internal beam measurement database (e.g., the beam measurement database 700 shown in FIG. 7A). In addition, at 910, the wireless communication device 902 transmits a beam measurement report, including the beam measurements, to the RAN node 904. The RAN node 904 may then select one or more serving transmit beams on which to transmit unicast downlink control information and/or user data traffic to the wireless communication device 902. In some examples, the selected serving transmit beam(s) have the highest gain from the beam measurement report.

At 912, the wireless communication device 902 forms BPLs between the serving transmit beams and serving receive beams. In some examples, the wireless communication device 902 may select a corresponding serving receive beam for each selected serving transmit beam to form the BPLs. For example, the wireless communication device 902 can access the beam measurement database containing the beam measurements to identify the serving transmit beams (e.g., two or more transmit beams with the highest gain, where the number of transmit beams is known based on, for example, UE capabilities). The wireless communication device 902 can then select the corresponding receive beam for each serving transmit beam based on the beam measurements. In some examples, the selected receive beam to pair with a particular transmit beam may have the highest gain for that particular transmit beam. In some examples, at least two of the selected receive beams correspond to different antenna array modules on the wireless communication device.

At 914, the wireless communication device 902 minimizes the number antenna array modules utilized to form the BPLs. The wireless communication device 902 can apply a joint optimization to both the beam measurements and the antenna array modules to minimize the number of antenna array modules. During joint optimization, the wireless communication device 902 can compare the beam measurements of each of the serving receive beams in each of the BPLs to determine whether a difference between beam measurements of two serving receive beams is less than a first threshold (e.g., alpha dBm).

When the difference in beam measurements of two serving receive beams is less than the first threshold, the wireless communication device 902 can select one of the two serving receive beams as an optimized receive beam. The wireless communication device 902 can further compare the beam measurements of the two serving receive beams with a second threshold (e.g., beta dBm) to verify that the RSRP of the serving receive beams meets a minimum RSRP value. When the beam measurements of the two serving receive beams are each greater than or equal to the second threshold, the wireless communication device 902 can modify the BPL of the other serving receive beam to include the optimized receive beam instead of the non-selected receive beam. Thus, the optimized receive beam can now form BPLs with each of the corresponding transmit beams. In addition, the wireless communication device 902 can turn on the power to the antenna array module corresponding to the optimized receive beam and turn off the power to the antenna array module corresponding to the non-selected receive beam.

In an example of N serving transmit beams and N serving receive beams, each of the N serving transmit beams can form a respective BPL with a different respective one of the N serving receive beams. In addition, the wireless communication device 902 can include N antenna array modules, each corresponding to one of the N serving receive beams. The measured RSRP of a receive beam can be denoted $rsrp\_ij$, where i refers to the serving receive beam and j refers to the antenna array module. Each antenna array module may be configured to generate multiple receive beams. However, in this example, there is only one serving receive beam per antenna array module (e.g., one receive beam selected to form a BPL). Thus, i=j. To minimize the number of antenna array modules, M serving receive beams out the N serving receive beams can be selected. Each of the selected M serving receive beams can meet the minimum threshold criteria (e.g., beta dBm). In addition, the respective beam measurement (e.g., RSRP value) of each of the M serving receive beams can be no more than alpha dBm more than the beam measurement of one of the non-selected receive beams (e.g., N-M serving receive beams) For example, the joint optimization algorithm can be represented as:

Minimize M
such that:

$rsrp\_ij$>beta, where $i=j$ max($rsrp\_kl$)−max($rsrp\_ij$)<alpha, where $k=1$, $i=j$, k is from the set of M and i is from the set of N.

In some examples, the first and second thresholds (alpha and beta) are predefined factory settings that are stored on a chipset of the wireless communication device 902. In other examples, alpha and beta are selected based on one or more factors. Examples of factors include, but are not limited to, a power state of the wireless communication device (e.g., a low power device or the status of a battery/power source), a data rate utilized for downlink transmissions, mobility of the wireless communication device, and a time variance of a channel between the wireless communication device and the RAN node. For example, the value of alpha may be high and the value of beta may be low when the wireless communication 902 is a low power device, when the battery power of the wireless communication device 902 is critical for an application or type of communication (e.g., URLLC or eMBB), or when the current battery power of the wireless communication device 902 is low. Similarly, for a slow time-varying channel with a lower data rate, the value of alpha may be high and the value of beta may be low.

In addition, the value of alpha may be low and the value of beta may be high when the wireless communication device 902 utilizes a high data rate. Similarly, for a slow time-varying channel with a high data rate, the value of alpha may be low and the value of beta may be high. Likewise, for a high mobility wireless communication device 902 or a fast time-varying channel, the value of alpha may be low and the value of beta may be high.

Although FIG. 9 illustrates the joint optimization occurring after performing a beam measurement procedure, in other examples, joint optimization of the serving receive beams and number of antenna array modules can occur at other periodicities, e.g., every X ms. In an example, the wireless communication device 902 can run the joint optimization procedure with a joint optimization periodicity corresponding to a multiple of a beam measurement periodicity. For example, the wireless communication device 902 can run the joint optimization procedure after every other beam measurement.

In another example, the wireless communication device 902 can run the joint optimization procedure based on a beam search periodicity. During a beam search (e.g., in a beam search phase of a beam search and measurement procedure), the wireless communication device 902 can update a list of transmit beams associated with the RAN node 904. For example, the wireless communication device 902 may detect new transmit beams and/or no longer detect previous transmit beams of the RAN node 904 while in the beam search phase. At the next beam measurement phase after the search phase, the wireless communication device 902 can obtain beam measurements on each of the receive beams for each of the transmit beams in the updated transmit beam list. The wireless communication device 902 can then update the beam measurement database with the new beam measurements. Based upon the new beam measurements, the wireless communication device can initiate the joint optimization procedure to minimize the number of active antenna array modules.

Figure 10:
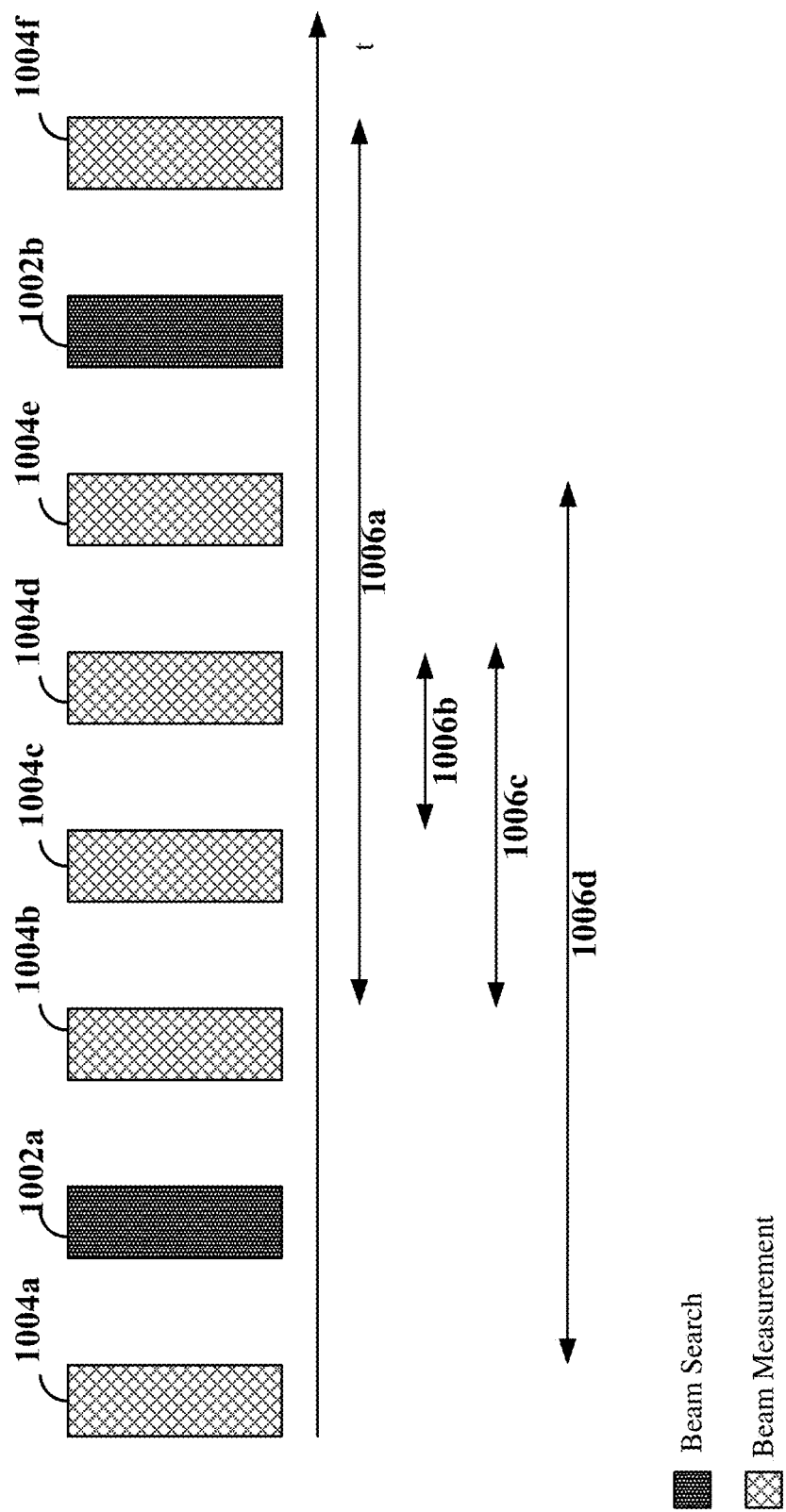
FIG. 10 is a diagram illustrating various periodicities for performing joint optimization according to some aspects.

FIG. 10 is a diagram illustrating various periodicities for performing joint optimization according to some aspects. FIG. 10 illustrates a plurality of beam search procedures 1002a and 1002b and a plurality of beam measurement procedures 1004a-1004f performed by a wireless communication device over time. Each beam search procedure 1002a and 1002b precedes a corresponding beam measurement procedure 1004b and 1004f, and as such each beam search procedure 1002a/1002b and corresponding beam measurement procedure 1004b/1004f may be considered respective phases of a beam search and measurement procedure.

A first periodicity 1006a for performing the joint optimization procedure corresponds to the periodicity of the beam search and measurement procedure. Thus, the joint optimization procedure may be performed after completion of each beam search and measurement procedure. For example, a first joint optimization procedure may be performed after the beam measurement phase 1004b following the search phase 1002a of a first beam search and measurement procedure. A second joint optimization procedure may be performed after the beam measurement phase 1004f following the beam search phase 1002b of a second beam search and measurement procedure. In some examples, the beam search and measurement periodicity 1006a is 80 ms. In this example, the joint optimization procedure may be initialized every 80 ms.

Other periodicities 1006b-1006d may be selected based on the beam measurement cycle. For example, a second periodicity 1006b may correspond to the beam measurement periodicity such that the wireless communication device initializes the joint optimization procedure after each beam measurement procedure (e.g., after beam measurement procedure 1004b and again after the next beam measurement procedure 1004c). In examples in which the beam measurement periodicity is 20 ms, the wireless communication device may initialize the joint optimization procedure every 20 ms. Joint optimization procedure periodicities 1006c and 1002d each correspond to a multiple of the beam measurement periodicity. For example, using periodicity 1006c, the wireless communication device may initialize the joint optimization procedure after every other beam measurement procedure (e.g., after beam measurement procedure 1004b and then again after beam measurement procedure 1004d). As another example, using periodicity 1006d, the wireless communication device may initialize the joint optimization procedure after every fourth beam measurement procedure (e.g., after beam measurement procedure 1004a and again after beam measurement procedure 1004e).

The particular joint optimization procedure periodicity 1006a-1006d may be selected based on one or more factors. Examples of factors include, but are not limited to, a power state of the wireless communication device (e.g., low power device or the status of a battery/power source), signal strength of downlink signals received from the RAN node, and the time variance of the channel between the wireless communication device and the RAN node. For example, when the wireless communication device is a low power device, when the battery power of the wireless communication device is critical for an application or type of communication (e.g., URLLC or eMBB), or when the current battery power of the wireless communication device is low, the wireless communication device can select a longer periodicity to reduce power consumption. Similarly, when the wireless communication device is in a discontinuous reception (DRX) mode with periods of waking-up to receive signals in between periods of sleeping, the wireless communication device can select a longer periodicity based on the DRX cycle.

In addition, when the signal strength in the cell served by the RAN node is high and/or the channel is a slow time-varying channel, the wireless communication device can select a longer periodicity (e.g., every X measurement cycles). However, when the signal strength in the cell is low and/or the channel is a fast time-varying channel, the wireless communication device can select a shorter periodicity. For example, the joint optimization procedure can be performed after each beam measurement procedure (e.g., corresponding to periodicity 1006b).

Figure 11:
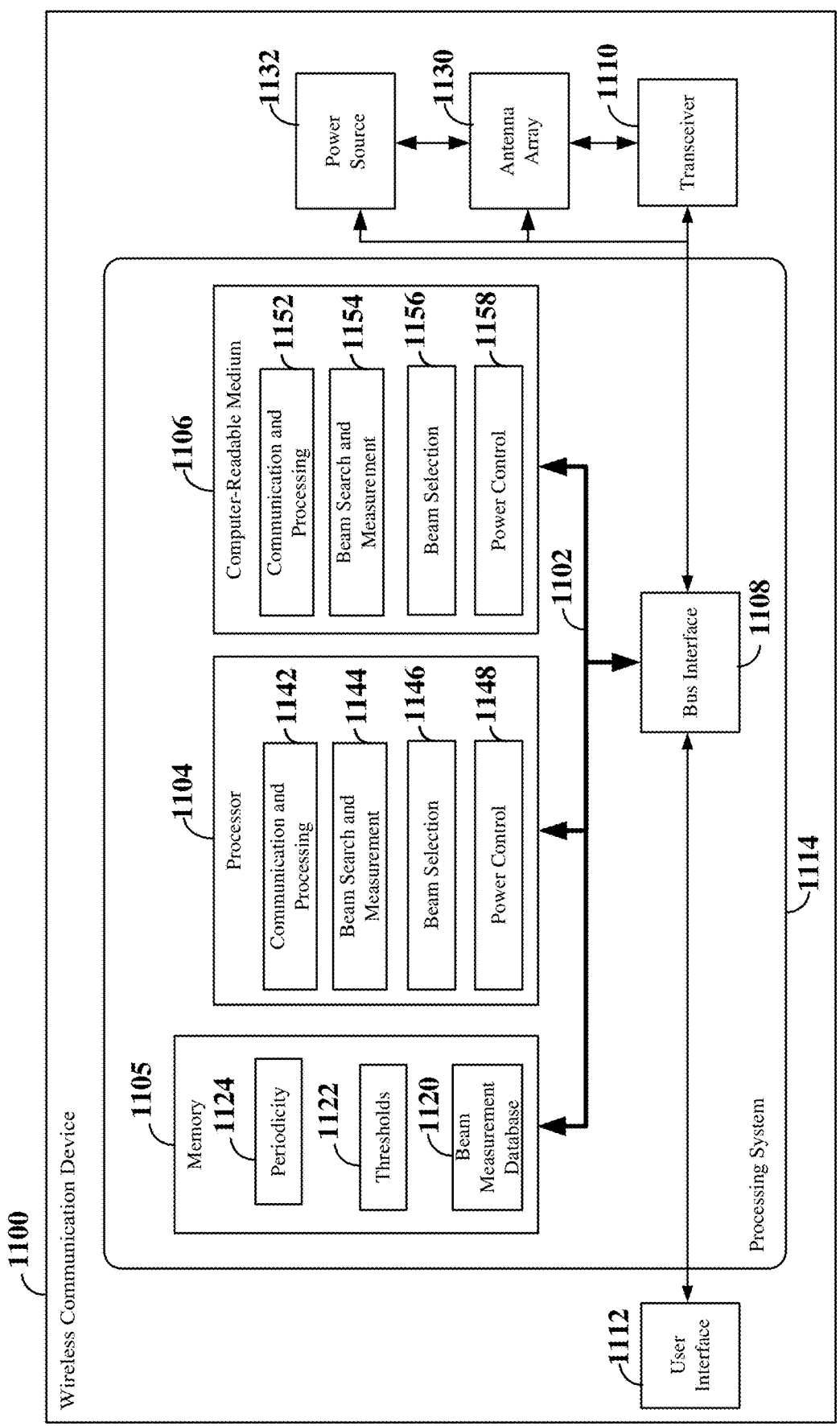
FIG. 11 is a block diagram illustrating an example of a hardware implementation for a wireless communication device employing a processing system according to some aspects.

FIG. 11 is a conceptual diagram illustrating an example of a hardware implementation for an exemplary wireless communication device employing a processing system 1114. For example, the wireless communication device 1100 may be a UE or other scheduled entity as illustrated in any one or more of FIGS. 1, 2, 5, 8 and/or 9.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in a wireless communication device 1100, may be used to implement any one or more of the processes described below in connection with FIG. 11.

The processor 1104 may in some instances be implemented via a baseband or modem chip and in other implementations, the processor 1104 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). A user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a RAN node (e.g., a base station, such as a gNB). In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to receive and process downlink beamformed signals at a mmWave frequency or a sub-6 GHz frequency via the transceiver 1110 and a plurality of antenna array modules 1130. For example, the communication and processing circuitry 1142 may be configured to receive a respective reference signal on each of a plurality of downlink beams from the RAN node during a beam sweep. The communication and processing circuitry 1142 may further be configured to transmit a beam measurement report to the RAN node. The communication and processing circuitry 1142 may further be configured to execute communication and processing software 1152 stored in the computer-readable medium 1106 to implement one or more of the functions described herein.

The processor 1104 may further include beam search and measurement circuitry 1144, configured to control the antenna array modules 1130 and transceiver 1110 to search for and identify a plurality of transmit beams (e.g., downlink transmit beams) during a downlink beam sweep. The beam search and measurement circuitry 1144 may further be configured to obtain a plurality of beam measurements on each of a plurality of receive beams of the antenna array modules 1130 for each of the identified transmit beams. For example, the beam search and measurement circuitry 1144 may be configured to measure a respective RSRP or other suitable beam measurement (e.g., SINR or RSRQ) of a respective beam reference signal transmitted on each of the transmit beams on each of the receive beams. The beam search and measurement circuitry 1144 may further be configured to populate a beam measurement database 1120 with the identified transmit beams and corresponding beam measurements obtained for each of the transmit beams on each of the receive beams. The beam measurement database 1120 may be stored, for example, in memory 1105. The beam search and measurement circuitry 1144 may further be configured to execute beam search and measurement software 1154 stored in the computer-readable medium 1106 to implement one or more of the functions described herein.

The processor 1104 may further include beam selection circuitry 1146, configured to form BPLs based on the beam measurements in the beam measurement database 1120. In some examples, the beam selection circuitry 1146 may be configured to identify the serving transmit beams and to select a serving receive beam for each of the serving transmit beam to form the BPLs. For example, the beam selection circuitry 1146 may be configured to compare the respective RSRP (or other beam measurement) measured on each of the receive beams for each of the serving transmit beams to identify the serving receive beams Each serving receive beam may have the highest measured RSRP (or other beam measurement) for that particular transmit beam.

The beam selection circuitry 1146 may further be configured to identify an antenna array module 1130 corresponding to each of the serving receive beams. When the number of antenna array modules 1130 corresponding to the serving receive beams is two or more, the beam selection circuitry 1146 may further be configured to perform a joint optimization procedure to minimize the number of antenna array modules 1130 utilized to form the BPLs. To minimize the number of antenna array modules 1130, the beam selection circuitry 1146 can select a different receive beam for at least one of the BPLs that results in at least one fewer of the antenna array modules 1130 being utilized to form the BPLs. The beam selection circuitry 1146 can select the different receive beam(s) based on the beam measurements maintained in the beam measurement database 1120. In some examples, the different receive beam selected for one of the BPLs is one of the other serving receive beams in another BPL. The beam selection circuitry 1146 is further configured to update the beam measurement database 1120 to indicate the changes in BPLs resulting from the joint optimization procedure.

In some examples, the beam selection circuitry 1146 may select the different receive beam based on one or more thresholds 1122. The thresholds 1122 may be stored, for example, in memory 1105. The thresholds 1122 may include, for example, a first threshold indicating a maximum beam measurement difference allowed between an original serving receive beam and the selected different serving receive beam for a particular BPL. As an example, the first threshold may be set to alpha dBm. The thresholds 1122 may further include a second threshold indicating a minimum beam measurement value that the serving receive beams (original and selected) should satisfy before replacing the original serving receive beam in a BPL. As an example, the second threshold can be set to beta dBm. In some examples, the first and second thresholds (alpha and beta) are predefined factory settings that are stored on the memory 1105. In other examples, the beam selection circuitry 1146 may be configured to dynamically select alpha and beta based on one or more factors. Examples of factors include, but are not limited to, a power state of the wireless communication device (e.g., a low power device or the status of a battery/power source), a data rate utilized for downlink transmissions, mobility of the wireless communication device, and a time variance of a channel between the wireless communication device and the RAN node.

In an example, the beam selection circuitry 1146 can be configured to identify a first BPL including a first transmit beam and a first receive beam, where the first receive beam corresponds to a first antenna array module. The beam selection circuitry 1146 can further be configured to identify a second BPL including a second transmit beam and a second receive beam, where the second receive beam corresponds to a second antenna array module different than the first antenna array module. In one example, the beam selection circuitry 1146 may be configured to modify the first BPL for the first transmit beam to include the second receive beam when the difference between a first beam measurement on the first receive beam for the first transmit beam and a second beam measurement on the second receive beam for the second transmit beam is less than or equal to the first threshold (e.g., the difference is within the first threshold). In another example, the beam selection circuitry 1146 may be configured to modify the first BPL for the first transmit beam to include the second receive beam when the beam measurement difference is within the first threshold and both the first beam measurement and the second beam measurement are greater than or equal to the second threshold (e.g., the first and second beam measurements satisfy the second threshold).

In some examples, the beam selection circuitry 1146 can be configured to initiate the joint optimization procedure based on a periodicity 1124 of the joint optimization procedure. The periodicity 1124 may be stored, for example, in memory 1105. In some examples, the beam selection circuitry 1146 may be configured to select the periodicity 1124 of the joint optimization procedure (e.g., the joint optimization periodicity) based on a periodicity of obtaining the beam measurements (e.g., the beam measurement periodicity). In an example, the joint optimization periodicity 1124 is equal to the beam measurement periodicity. In this example, the beam selection circuitry 1146 is configured to perform the joint optimization procedure after each beam measurement procedure. In another example, the joint optimization periodicity 1124 includes a multiple (e.g., two or more) of the beam measurement periodicity. In this example, the joint optimization procedure is performed less frequently. For example, the joint optimization procedure may be performed after every other beam measurement procedure, after each beam search procedure, or other suitable periodicity selected based on the beam measurement periodicity.

The beam selection circuitry 1146 may further be configured to select the joint optimization periodicity 1124 based on one or more factors. Examples of factors include, but are not limited to, a power state of the wireless communication device (e.g., low power device or the status of a battery/power source), signal strength of downlink signals received from the RAN node, and the time variance of the channel between the wireless communication device and the RAN node. The beam selection circuitry 1146 may further be configured to execute beam selection software 1156 stored in the computer-readable medium 1106 to implement one or more of the functions described herein.

The processor 1104 may further include power control circuitry 1148, configured to control a power source 1132 (e.g., a battery). The power control circuitry 1148 can control the power source 1132 to turn on or turn off power to one or more of the antenna array modules 1130. After each joint optimization procedure, the beam selection circuitry 1146 can instruct the power control circuitry 1148 to access the beam measurement database 1120 to identify the selected serving receive beams associated with the BPLs. The power control circuitry 1148 can then be configured to control the power source 1132 to turn on power to the antenna array modules 1130 corresponding to selected serving receive beams and to turn off power to any antenna array modules no longer having a serving receive beam associated therewith. For example, after modifying a BPL to include a different receive beam than an original receive beam, the power control circuitry 1148 can control the power source 1132 to turn off power to the antenna array module corresponding to the original receive beam (e.g., when that antenna array module has no other serving receive beam). The power control circuitry 1148 may further be configured to execute power control software 1158 stored in the computer-readable medium 1106 to implement one or more of the functions described herein.

Figure 12:
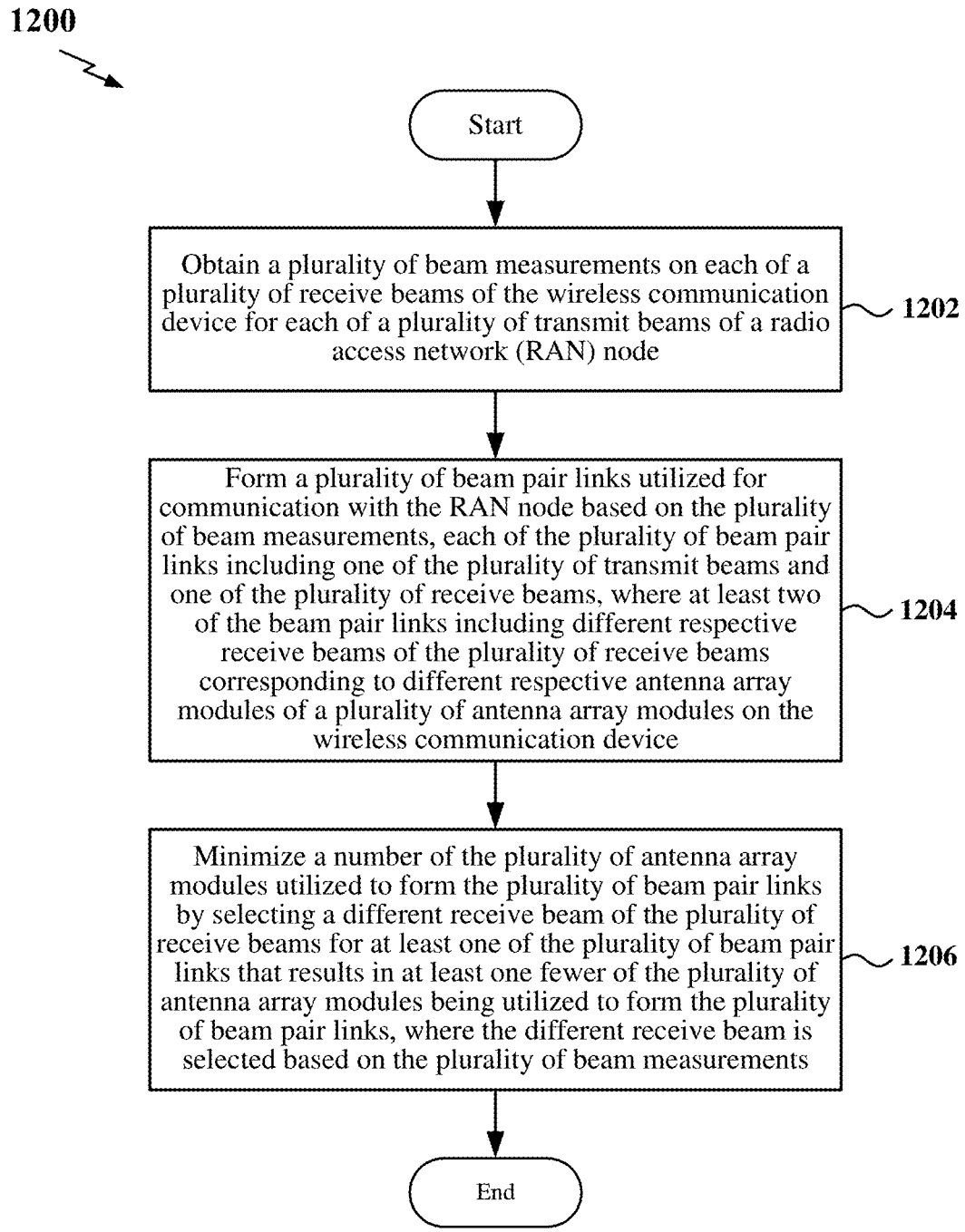
FIG. 12 is a flow chart of an exemplary method for a wireless communication device to optimize receive beam selection according to some aspects.

FIG. 12 is a flow chart 1200 illustrating an example of a method for a wireless communication device to optimize receive beam selection according to some aspects. As described below, some or all illustrated features may be omitted in a particular implementation within the scope of the present disclosure, and some illustrated features may not be required for implementation of all embodiments. In some examples, the method may be performed by the wireless communication device 1100, as described above and illustrated in FIG. 11, by a processor or processing system, or by any suitable means for carrying out the described functions.

At block 1202, the wireless communication device may obtain a plurality of beam measurements on each of a plurality of receive beams of the wireless communication device for each of a plurality of transmit beams of a radio access network (RAN) node (e.g., a base station, such as a gNB). In some examples, the wireless communication device may search for the plurality of transmit beams and then measure a beam reference signal on each of the plurality of beams to obtain the plurality of beam measurements. In some examples, the beam reference signal includes an SSB and the plurality of beam measurements include RSRP measurements, SINR measurements, or RSRQ measurement. For example, the RAN node may transmit a beam reference signal (e.g., SSB) on each of the plurality of transmit beams during a beam sweep to the wireless communication device. The wireless communication device may then identify and perform beam measurements on each of the plurality of transmit beams. For example, the communication and processing circuitry 1142, together with the beam search and measurement circuitry 1144, antenna array modules 1130, and transceiver 1110, shown and described above in connection with FIG. 11 may obtain the plurality of beam measurements.

At block 1204, the wireless communication device may form a plurality of beam pair links utilized for communication with the RAN node based on the plurality of beam measurements. Each of the plurality of beam pair links includes one of the plurality of transmit beams and one of the plurality of receive beams. At least two of the beam pair links include different respective receive beams of the plurality of receive beams corresponding to different respective antenna array modules of a plurality of antenna array modules on the wireless communication device. For example, the beam selection circuitry 1146 shown and described above in connection with FIG. 11 may form the beam pair links.

At block 1206, the wireless communication device may minimize a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links. The different receive beam is selected based on the plurality of beam measurements. In some examples, the different receive beam selected for one beam pair link of the plurality of beam pair links includes the one of the plurality of receive beams in another beam pair link of the plurality of beam pair links. The wireless communication device may minimize the number of antenna array modules during a joint optimization procedure that jointly optimizes the receive beams used in beam pair links and the number of antenna array modules. For example, the beam selection circuitry 1146 shown and described above in connection with FIG. 11 may minimize the number of antenna array modules utilized to form the plurality of beam pair links.

In some examples, the wireless communication device can modify one or more of the beam pair links to include a different respective receive beam based on one or more thresholds. For example, the wireless communication device can modify a beam pair link to remove an original receive beam and include a new (e.g., different) receive beam when a difference between the beam measurements of the original and new receive beams is within a first threshold and the beam measurements of the original beam and the new beam satisfy a second threshold. The first and second thresholds may be selected, for example, based on one or more factors (e.g., a power state of the wireless communication device, a data rate, a mobility of the wireless communication device, or a time variance of a channel between the wireless communication device and the RAN node). In some examples, the wireless communication device can further turn off power to the antenna array module(s) no longer having a receive beam in a BPL.

Figure 13:
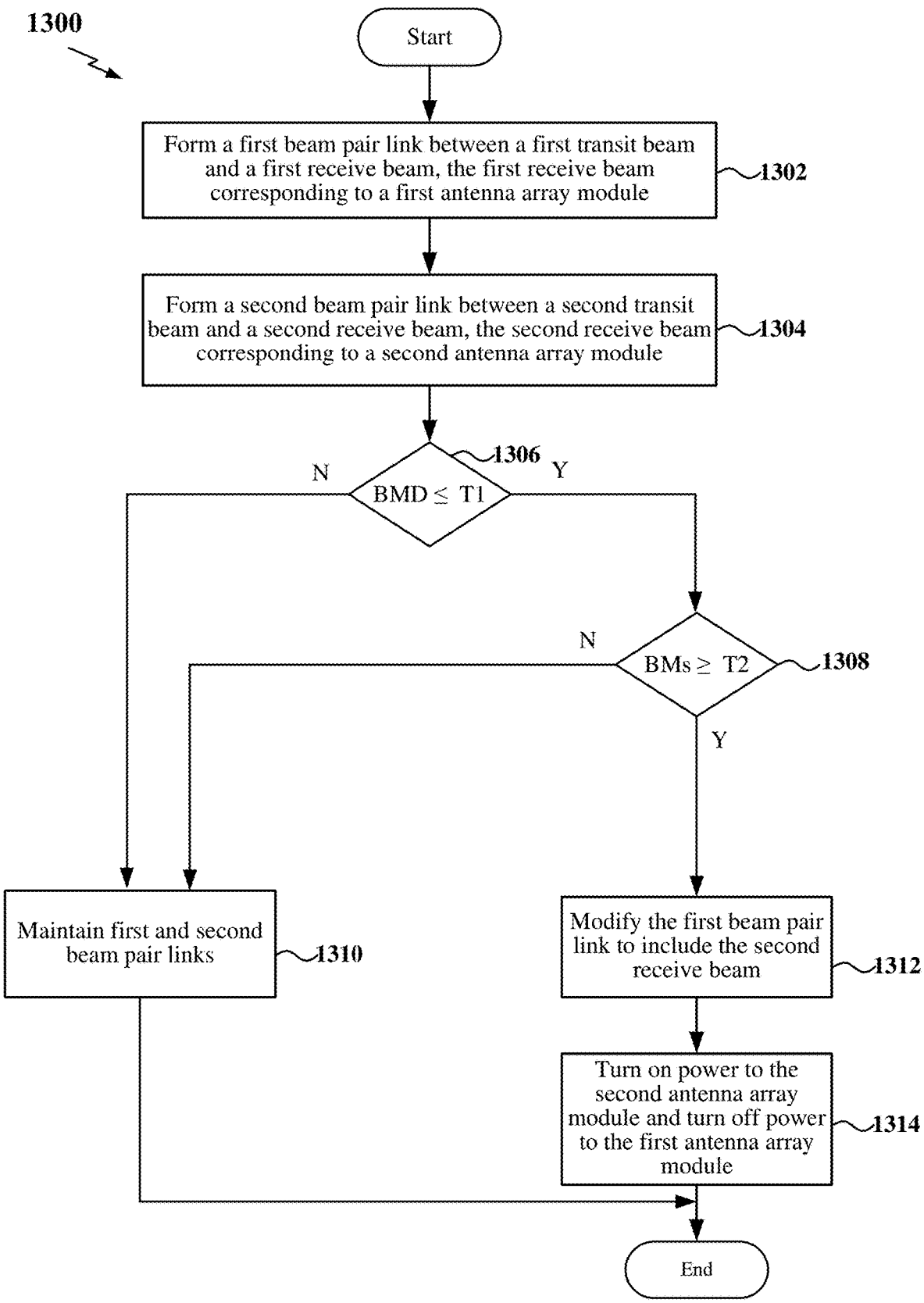
FIG. 13 is a flow chart of another exemplary method for a wireless communication device to optimize receive beam selection according to some aspects.

FIG. 13 is a flow chart 1300 illustrating another example of a method for a wireless communication device to optimize receive beam selection according to some aspects. As described below, some or all illustrated features may be omitted in a particular implementation within the scope of the present disclosure, and some illustrated features may not be required for implementation of all embodiments. In some examples, the method may be performed by the wireless communication device 1100, as described above and illustrated in FIG. 11, by a processor or processing system, or by any suitable means for carrying out the described functions.

At block 1302, the wireless communication device may form a first beam pair link between a first transmit beam of a radio access network (RAN) node and a first receive beam of the wireless communication device. The first receive beam corresponds to a first antenna array module on the wireless communication device. At block 1304, the wireless communication device may form a second beam pair link between a second transmit beam of the RAN node and a second receive beam of the wireless communication device. The second receive beam corresponds to a second antenna array module on the wireless communication device different than the first antenna array module. Each of the first and second beam pair links can be formed based on respective beam measurements obtained on each of the first and second receive beams for each of the first and second transmit beams, respectively. For example, the beam selection circuitry 1146 shown and described above in connection with FIG. 11 may form the first and second beam pair links.

At block 1306, the wireless communication device may determine whether a beam measurement difference (BMD) between a first beam measurement on the first receive beam for the first transmit beam and a second beam measurement on the second receive beam for the second transmit beam is less than or equal to a first threshold (T1). In some examples, T1 may be set to alpha dBm. For example, the beam selection circuitry 1146 shown and described above in connection with FIG. 11 may determine whether the BMD is less than or equal to T1.

When the BMD is less than or equal to T1 (Y branch of block 1306), at block 1308, the wireless communication device may determine whether the first and second beam measurements (BMs) are greater than or equal to a second threshold (T2). In some examples, the second threshold (T2) may be set to beta dBm. The first and second thresholds (T1 and T2) can be predefined factory settings and/or may be selected or modified based on one or more factors. The one or more factors can include at least one of a power state of the wireless communication device, a data rate, a mobility of the wireless communication device, or a time variance of a channel between the wireless communication device and the RAN node. For example, the beam selection circuitry 1146 shown and described above in connection with FIG. 11 may determine whether the second beam measurement is greater than or equal to T2.

When either the BMD is greater than T1 (N branch of block 1306) or the BMs are less than T2 (N branch of block 1308), at block 1310, the wireless communication device may maintain the first and second beam pair links without making any modifications thereto. Thus, the wireless communication device may maintain power to both the first and second antenna array modules to form the first and second beam pair links. For example, the beam selection circuitry 1146 and power control circuitry 1148 shown and described above in connection with FIG. 11 can maintain the first and second beam pair links.

When the BMs are greater than or equal to T2 (Y branch of block 1308), at block 1312, the wireless communication device may modify the first beam pair link to include the second receive beam. Thus, the wireless communication device can remove the first receive beam from the first beam pair link and instead include the second receive beam in the first beam pair link. For example, the beam selection circuitry 1146 shown and described above in connection with FIG. 11 can modify the first beam pair link to include the second receive beam.

At block 1314, the wireless communication device may turn off power to the first antenna array module after modifying the first beam pair link to include the second receive beam. For example, the power control circuitry 1148, together with the power source 1132 shown and described above in connection with FIG. 11 can turn on power to the second antenna array module and turn off power to the first antenna array module (e.g., within the antenna array modules 1130).

Figure 14:
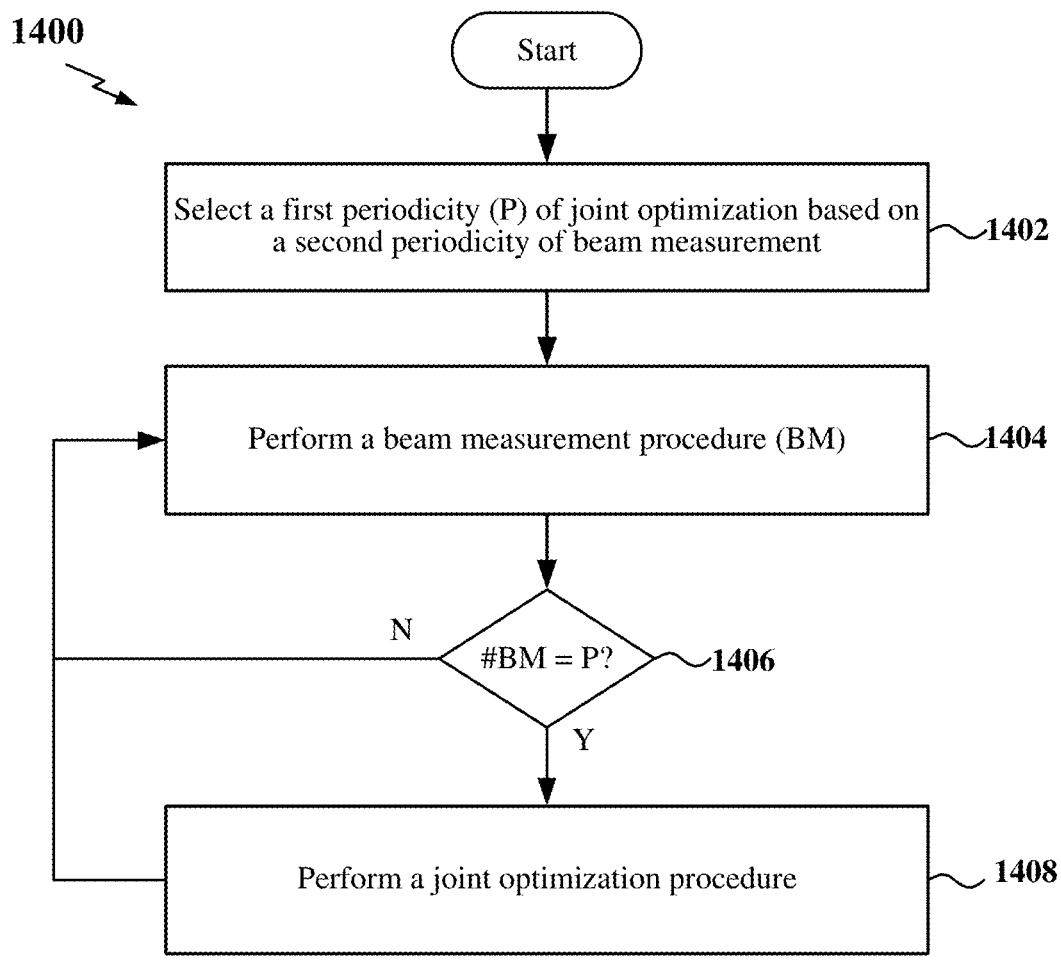
FIG. 14 is a flow chart illustrating another example of a method for a wireless communication device to optimize receive beam selection according to some aspects.

FIG. 14 is a flow chart 1400 illustrating another example of a method for a wireless communication device to optimize receive beam selection according to some aspects. As described below, some or all illustrated features may be omitted in a particular implementation within the scope of the present disclosure, and some illustrated features may not be required for implementation of all embodiments. In some examples, the method may be performed by the wireless communication device 1100, as described above and illustrated in FIG. 11, by a processor or processing system, or by any suitable means for carrying out the described functions.

At block 1402, the wireless communication device may select a first periodicity (P) of joint optimization of receive beams and antenna array modules based on a second periodicity of beam measurement. In some examples, the first periodicity is equal to the second periodicity. In other examples, the first periodicity includes a multiple (e.g., two or more) of the second periodicity. For example, the first periodicity may correspond to a beam search periodicity of a beam search and measurement procedure. In some examples, the wireless communication device can select the first periodicity based on one or more factors. Examples of factors include, but are not limited to, a power state of the wireless communication device (e.g., low power device or the status of a battery/power source), signal strength of downlink signals received from the RAN node, and the time variance of the channel between the wireless communication device and the RAN node. For example, the beam selection circuitry 1146 shown and described above in connection with FIG. 11 may select the first periodicity of joint optimization.

At block 1404, the wireless communication device may perform a beam measurement procedure to obtain a plurality of beam measurements on each of a plurality of receive beams of the wireless communication device for each of a plurality of transmit beams of the RAN node. In some examples, the wireless communication device may search for the plurality of transmit beams and then measure a beam reference signal on each of the plurality of beams to obtain the plurality of beam measurements. In some examples, the beam reference signal includes an SSB and the plurality of beam measurements include RSRP measurements, SINR measurements, or RSRQ measurement. For example, the RAN node may transmit a beam reference signal (e.g., SSB) on each of the plurality of transmit beams during a beam sweep to the wireless communication device. The wireless communication device may then identify and perform beam measurements on each of the plurality of transmit beams. For example, the communication and processing circuitry 1142, together with the beam search and measurement circuitry 1144, antenna array modules 1130, and transceiver 1110, shown and described above in connection with FIG. 11 may perform the beam measurement procedure.

At block 1406, the wireless communication device determines whether the number of beam measurement procedures (#BM) performed is equal to the first periodicity (P) of joint optimization. When the number of beam measurement procedures performed is equal to the first periodicity (Y branch of block 1406), the wireless communication device may perform a joint optimization procedure. During the joint optimization procedure, the wireless communication device may minimize the number of antenna array modules utilized in forming beam pair links between receive beams and transmit beams. The wireless communication device may minimize the number of antenna array modules by further minimizing the number of serving receive beams in the beam pair links. For example, one or more of the serving receive beams may each serve two or more of the serving transmit beams to form corresponding beam pair links therebetween. In some examples, the wireless communication device may select a different receive beam for at least one of the beam pair links that results in at least one fewer of the antenna array modules being utilized to form beam pair links. The method then repeats at block 1404. For example, the beam selection circuitry 1146, together with the power control circuitry 1148, shown and described above in connection with FIG. 11 may periodically perform the joint optimization procedure based on the first periodicity.

The processes shown in FIGS. 12-14 may include additional aspects, such as any single aspect or any combination of aspects described below and/or in connection with one or more other processes described elsewhere herein.

In a first aspect, a wireless communication device (e.g., a UE) may obtain a plurality of beam measurements on each of a plurality of receive beams of the wireless communication device for each of a plurality of transmit beams of a radio access network (RAN) node. A plurality of beam pair links utilized for communication with the RAN node may then be formed based on the plurality of beam measurements. Each of the plurality of beam pair links may include one of the plurality of transmit beams and one of the plurality of receive beams. At least two of the plurality of beam pair links may include different respective receive beams of the plurality of receive beams corresponding to different respective antenna array modules of a plurality of antenna array modules on the wireless communication device. The wireless communication device may then minimize a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links. The different receive beam may be selected based on the plurality of beam measurements.

In a second aspect, alone or in combination with the first aspect, the different receive beam selected for one beam pair link includes the receive beams in another beam pair link.

In a third aspect, alone or in combination with one or more of the first and second aspects, a first beam pair link of the plurality of beam pair links includes a first transmit beam of the plurality of transmit beams and a first receive beam of the plurality of receive beams, a second beam pair link of the plurality of beam pair links includes a second transmit beam of the plurality of transmit beams and a second receive beam of the plurality of receive beams, and the first receive beam corresponds to a first antenna array module of the plurality of antenna array modules and the second receive beam corresponds to a second antenna array module of the plurality of antenna array modules different than the first antenna array module.

In a fourth aspect, alone or in combination with one or more of the first through third aspects, the wireless communication device may modify the first beam pair link for the first transmit beam to include the second receive beam when a difference between a first beam measurement of the plurality of beam measurements on the first receive beam for the first transmit beam and a second beam measurement of the plurality of beam measurements on the second receive beam for the second transmit beam is less than or equal to a first threshold.

In a fifth aspect, alone or in combination with one or more of the first through fourth aspects, the wireless communication device may confirm that the first beam measurement and the second beam measurement are each greater than or equal to a second threshold prior to modifying the first beam pair link for the first transmit beam to include the second receive beam.

In a sixth aspect, alone or in combination with one or more of the first through fifth aspects, the wireless communication device may select the first threshold and the second threshold based on one or more factors.

In a seventh aspect, alone or in combination with one or more of the first through sixth aspects, the one or more factors may include at least one of a power state of the wireless communication device, a data rate, a mobility of the wireless communication device, or a time variance of a channel between the wireless communication device and the RAN node.

In an eighth aspect, alone or in combination with one or more of the first through seventh aspects, the wireless communication device may turn on power to the second antenna array module and turn off power to the first antenna array module on the wireless communication device after modifying the first beam pair link for the first transmit beam to include the second receive beam corresponding to the second antenna array module.

In a ninth aspect, alone or in combination with one or more of the first through eighth aspects, the wireless communication device may measure a respective beam reference signal transmitted on each of the plurality of transmit beams on each of the plurality of receive beams to obtain the plurality of beam measurements.

In a tenth aspect, alone or in combination with one or more of the first through ninth aspects, the wireless communication device may select a first periodicity of minimizing the number of the plurality of antenna array modules utilized to form the plurality of beam pair links based on at least a second periodicity of measuring the respective beam reference signal transmitted on each of the plurality of transmit beams on each of the plurality of receive beams.

In an eleventh aspect, alone or in combination with one or more of the first through tenth aspects, the first periodicity may be equal to the second periodicity.

In a twelfth aspect, alone or in combination with one or more of the first through eleventh aspects, the wireless communication device may select the first periodicity based on at least one of a power state of the wireless communication device, signal strength of downlink signals received from the wireless communication device, or a time variance of a channel between the wireless communication device and the RAN node.

In a thirteenth aspect, alone or in combination with one or more of the first through twelfth aspects, the first periodicity may include a multiple of the second periodicity.

In one configuration, a wireless communication device includes means for obtaining a plurality of beam measurements on each of a plurality of receive beams of the wireless communication device for each of a plurality of transmit beams of a radio access network (RAN) node. The wireless communication device further includes means for forming a plurality of beam pair links utilized for communication with the RAN node based on the plurality of beam measurements, where each of the plurality of beam pair links includes one of the plurality of transmit beams and one of the plurality of receive beams, and at least two of the plurality of beam pair links include different respective receive beams of the plurality of receive beams corresponding to different respective antenna array modules of a plurality of antenna array modules on the wireless communication device. The wireless communication device further includes means for minimizing a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair link, where the different receive beam is selected based on the plurality of beam measurements.

In one aspect, the aforementioned means for obtaining the plurality of beam measurements, forming the plurality of beam pair links, and minimizing the number of antenna array modules utilized in forming the beam pair links may be the processor 1104 shown in FIG. 11 configured to perform the functions recited by the aforementioned means. For example, the aforementioned means for obtaining the plurality of beam measurements may include the communication and processing circuitry 1142, together with the beam search and measurement circuitry 1144, antenna array modules 1130, and transceiver 1110 shown in FIG. 11. As another example, the aforementioned means for forming the plurality of beam pair links may include the beam selection circuitry 1146 shown in FIG. 11. As yet another example, the aforementioned means for minimizing the number of antenna array modules utilized to form the beam pair links may include the beam selection circuitry 1146 shown in FIG. 11. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, 9, and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device in a wireless communication network, the method comprising:
   obtaining a plurality of beam measurements on each of a plurality of receive beams of the wireless communication device for each of a plurality of transmit beams of a radio access network (RAN) node;
   forming a plurality of beam pair links utilized for communication with the RAN node based on the plurality of beam measurements, each of the plurality of beam pair links comprising one of the plurality of transmit beams and one of the plurality of receive beams, wherein at least two of the plurality of beam pair links comprise different respective receive beams of the plurality of receive beams corresponding to different respective antenna array modules of a plurality of antenna array modules on the wireless communication device; and
   minimizing a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links, wherein the different receive beam is selected based on the plurality of beam measurements.

2. The method of claim 1, wherein the different receive beam selected for one beam pair link of the plurality of beam pair links comprises the one of the plurality of receive beams in another beam pair link of the plurality of beam pair links.

3. The method of claim 1, wherein:
   a first beam pair link of the plurality of beam pair links comprises a first transmit beam of the plurality of transmit beams and a first receive beam of the plurality of receive beams,
   a second beam pair link of the plurality of beam pair links comprises a second transmit beam of the plurality of transmit beams and a second receive beam of the plurality of receive beams, and
   the first receive beam corresponds to a first antenna array module of the plurality of antenna array modules and the second receive beam corresponds to a second antenna array module of the plurality of antenna array modules different than the first antenna array module.

4. The method of claim 3, wherein the minimizing the number of the plurality of antenna array modules further comprises:
modifying the first beam pair link for the first transmit beam to comprise the second receive beam when a difference between a first beam measurement of the plurality of beam measurements on the first receive beam for the first transmit beam and a second beam measurement of the plurality of beam measurements on the second receive beam for the second transmit beam is less than or equal to a first threshold.

5. The method of claim 4, wherein the modifying the first beam pair link for the first transmit beam to comprise the second receive beam further comprises:
confirming that the first beam measurement and the second beam measurement are each greater than or equal to a second threshold prior to modifying the first beam pair link for the first transmit beam to comprise the second receive beam.

6. The method of claim 5, further comprising:
selecting the first threshold and the second threshold based on one or more factors.

7. The method of claim 6, wherein the one or more factors comprise at least one of a power state of the wireless communication device, a data rate, a mobility of the wireless communication device, or a time variance of a channel between the wireless communication device and the RAN node.

8. The method of claim 4, further comprising:
turning on power to the second antenna array module and turning off power to the first antenna array module on the wireless communication device after the modifying the first beam pair link for the first transmit beam to comprise the second receive beam corresponding to the second antenna array module.

9. The method of claim 1, wherein obtaining the plurality of beam measurements further comprises:
measuring a respective beam reference signal transmitted on each of the plurality of transmit beams on each of the plurality of receive beams to obtain the plurality of beam measurements.

10. The method of claim 9, further comprising:
selecting a first periodicity of the minimizing the number of the plurality of antenna array modules utilized to form the plurality of beam pair links based on at least a second periodicity of the measuring the respective beam reference signal transmitted on each of the plurality of transmit beams on each of the plurality of receive beams.

11. The method of claim 10, wherein the first periodicity is equal to the second periodicity.

12. The method of claim 10, wherein the selecting the first periodicity of the minimizing the number of the plurality of antenna array modules utilized to form the plurality of beam pair links further comprises:
selecting the first periodicity of the minimizing the number of the plurality of antenna array modules utilized to form the plurality of beam pair links further based on at least one of a power state of the wireless communication device, signal strength of downlink signals received from the wireless communication device, or a time variance of a channel between the wireless communication device and the RAN node.

13. The method of claim 12, wherein the first periodicity comprises a multiple of the second periodicity.

14. A wireless communication device in a wireless communication network, comprising:

a wireless transceiver;
a memory; and
a processor communicatively coupled to the wireless transceiver and the memory, wherein the processor is configured to:
obtain a plurality of beam measurements on each of a plurality of receive beams of the wireless communication device for each of a plurality of transmit beams of a radio access network (RAN) node;
form a plurality of beam pair links utilized for communication with the RAN node based on the plurality of beam measurements, each of the plurality of beam pair links comprising one of the plurality of transmit beams and one of the plurality of receive beams, wherein at least two of the plurality of beam pair links comprise different respective receive beams of the plurality of receive beams corresponding to different respective antenna array modules of a plurality of antenna array modules on the wireless communication device; and
minimize a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links, wherein the different receive beam is selected based on the plurality of beam measurements.

15. The wireless communication device of claim 14, wherein:
a first beam pair link of the plurality of beam pair links comprises a first transmit beam of the plurality of transmit beams and a first receive beam of the plurality of receive beams,
a second beam pair link of the plurality of beam pair links comprises a second transmit beam of the plurality of transmit beams and a second receive beam of the plurality of receive beams, and
the first receive beam corresponds to a first antenna array module of the plurality of antenna array modules and the second receive beam corresponds to a second antenna array module of the plurality of antenna array modules different than the first antenna array module.

16. The wireless communication device of claim 15, wherein the processor and the memory are further configured to:
modify the first beam pair link for the first transmit beam to comprise the second receive beam when a difference between a first beam measurement of the plurality of beam measurements on the first receive beam for the first transmit beam and a second beam measurement of the plurality of beam measurements on the second receive beam for the second transmit beam is less than or equal to a first threshold.

17. The wireless communication device of claim 16, wherein the processor and the memory are further configured to:
confirm that the first beam measurement and the second beam measurement are each greater than or equal to a second threshold prior to modifying the first beam pair link for the first transmit beam to comprise the second receive beam.

18. The wireless communication device of claim 17, wherein the processor and the memory are further configured to:

select the first threshold and the second threshold based on at least one of a power state of the wireless communication device, a data rate, a mobility of the wireless communication device, or a time variance of a channel between the wireless communication device and the RAN node.

19. The wireless communication device of claim 16, wherein the processor and the memory are further configured to:
turn on power to the second antenna array module and turn off power to the first antenna array module on the wireless communication device after the modifying the first beam pair link for the first transmit beam to comprise the second receive beam corresponding to the second antenna array module.

20. The wireless communication device of claim 14, wherein the processor and the memory are further configured to:
select a first periodicity of minimizing the number of the plurality of antenna array modules utilized to form the plurality of beam pair links based on at least a second periodicity of measuring a respective beam reference signal transmitted on each of the plurality of transmit beams on each of the plurality of receive beams to obtain the plurality of beam measurements.

21. The wireless communication device of claim 20, wherein the first periodicity is equal to the second periodicity or comprises a multiple of the second periodicity.

22. The wireless communication device of claim 20, wherein the processor and the memory are configured to:
select the first periodicity of the minimizing the number of the plurality of antenna array modules utilized to form the plurality of beam pair links further based on at least one of a power state of the wireless communication device, signal strength of downlink signals received from the wireless communication device, or a time variance of a channel between the wireless communication device and the RAN node.

23. A wireless communication device in a wireless communication network, comprising:
means for obtaining a plurality of beam measurements on each of a plurality of receive beams of the wireless communication device for each of a plurality of transmit beams of a radio access network (RAN) node;
means for forming a plurality of beam pair links utilized for communication with the RAN node based on the plurality of beam measurements, each of the plurality of beam pair links comprising one of the plurality of transmit beams and one of the plurality of receive beams, wherein at least two of the plurality of beam pair links comprise different respective receive beams of the plurality of receive beams corresponding to different respective antenna array modules of a plurality of antenna array modules on the wireless communication device; and
means for minimizing a number of the plurality of antenna array modules utilized to form the plurality of beam pair links by selecting a different receive beam of the plurality of receive beams for at least one of the plurality of beam pair links that results in at least one fewer of the plurality of antenna array modules being utilized to form the plurality of beam pair links, wherein the different receive beam is selected based on the plurality of beam measurements.

24. The wireless communication device of claim 23, wherein:
a first beam pair link of the plurality of beam pair links comprises a first transmit beam of the plurality of transmit beams and a first receive beam of the plurality of receive beams,
a second beam pair link of the plurality of beam pair links comprises a second transmit beam of the plurality of transmit beams and a second receive beam of the plurality of receive beams, and
the first receive beam corresponds to a first antenna array module of the plurality of antenna array modules and the second receive beam corresponds to a second antenna array module of the plurality of antenna array modules different than the first antenna array module.

25. The wireless communication device of claim 24, wherein the means for minimizing the number of the plurality of antenna array modules further comprises:
means for modifying the first beam pair link for the first transmit beam to comprise the second receive beam when a difference between a first beam measurement of the plurality of beam measurements on the first receive beam for the first transmit beam and a second beam measurement of the plurality of beam measurements on the second receive beam for the second transmit beam is less than or equal to a first threshold.

26. The wireless communication device of claim 25, wherein the means for minimizing the number of the plurality of antenna array modules further comprises:
means for confirming that the first beam measurement and the second beam measurement are each greater than or equal to a second threshold prior to modifying the first beam pair link for the first transmit beam to comprise the second receive beam.

27. The wireless communication device of claim 26, further comprising:
means for selecting the first threshold and the second threshold based on at least one of a power state of the wireless communication device, a data rate, a mobility of the wireless communication device, or a time variance of a channel between the wireless communication device and the RAN node.

28. The wireless communication device of claim 25, further comprising:
means for turning on power to the second antenna array module and turning off power to the first antenna array module on the wireless communication device after the modifying the first beam pair link for the first transmit beam to comprise the second receive beam corresponding to the second antenna array module.

29. The wireless communication device of claim 23, further comprising:
means for measuring a respective beam reference signal transmitted on each of the plurality of transmit beams on each of the plurality of receive beams to obtain the plurality of beam measurements; and
means for selecting a first periodicity of the means for minimizing the number of the plurality of antenna array modules utilized to form the plurality of beam pair links based on at least a second periodicity of the means for measuring the respective beam reference signal transmitted on each of the plurality of transmit beams on each of the plurality of receive beams.

30. The wireless communication device of claim 29, wherein the first periodicity is equal to the second periodicity or comprises a multiple of the second periodicity.

* * * * *